(12) United States Patent
Hayashi et al.

(10) Patent No.: US 11,207,774 B2
(45) Date of Patent: Dec. 28, 2021

(54) AUTONOMOUSLY ACTING ROBOT THAT IMAGINES VIRTUAL CHARACTER

(71) Applicant: GROOVE X, Inc., Tokyo (JP)

(72) Inventors: Kaname Hayashi, Tokyo (JP); Junya Hayashi, Tokyo (JP)

(73) Assignee: GROOVE X, INC., Tokyo (JP)

( * ) Notice: Subject to any disclaimer, the term of this patent is extended or adjusted under 35 U.S.C. 154(b) by 225 days.

(21) Appl. No.: 16/443,762

(22) Filed: Jun. 17, 2019

(65) Prior Publication Data

US 2019/0389058 A1    Dec. 26, 2019

(30) Foreign Application Priority Data

Jun. 25, 2018 (JP) .............................. JP2018-119717

(51) Int. Cl.
*B25J 9/16* (2006.01)
*B25J 9/00* (2006.01)
*G05D 1/00* (2006.01)

(52) U.S. Cl.
CPC ............ *B25J 9/163* (2013.01); *B25J 9/0003* (2013.01); *B25J 9/1664* (2013.01); *B25J 9/1697* (2013.01); *G05D 1/0044* (2013.01); *G05D 1/0088* (2013.01)

(58) Field of Classification Search
CPC ........ B25J 9/163; B25J 9/0003; B25J 9/1664; B25J 9/1697; G05D 1/0044; G05D 1/0088

See application file for complete search history.

(56) References Cited

U.S. PATENT DOCUMENTS

| | | | |
|---|---|---|---|
| 6,565,371 B1 | 5/2003 | Watanabe | |
| 6,609,147 B1 * | 8/2003 | Matsuda | A63F 13/12 709/205 |
| 7,685,518 B2 * | 3/2010 | Matsuda | G06F 3/0481 715/706 |
| 7,747,350 B2 * | 6/2010 | Matsuzaki | A63H 11/00 700/245 |
| 8,287,372 B2 * | 10/2012 | Hong | A63F 13/02 463/34 |
| 8,706,295 B2 * | 4/2014 | Park | B25J 13/006 700/245 |
| 9,639,150 B2 * | 5/2017 | Linden | H04W 4/16 |
| 9,643,314 B2 * | 5/2017 | Guerin | B25J 9/1605 |
| 10,349,245 B2 * | 7/2019 | Tokuchi | H04W 4/38 |
| 10,860,100 B2 * | 12/2020 | Osterhout | G06F 1/163 |
| 2018/0333862 A1 | 11/2018 | Hayashi | |
| 2020/0290198 A1 * | 9/2020 | Yanase | A63F 13/825 |

FOREIGN PATENT DOCUMENTS

JP    2000-323219 A    11/2000
WO   2017/169826 A1   10/2017

* cited by examiner

*Primary Examiner* — Nicholas Kiswanto
(74) *Attorney, Agent, or Firm* — Hauptman Ham, LLP

(57) ABSTRACT

Moderate heteronomy is introduced while respecting a concept of a robot that acts autonomously. A robot includes an actuality input system that acquires environment information relating to an actual space, a virtual reality input system that acquires an action order forwarded by a fairy, an operation control unit that determines a first motion of the robot in accordance with the action order based on the environment information, and determines a second motion of the robot in accordance with the action order, and a drive mechanism that executes the first motion and the second motion.

20 Claims, 25 Drawing Sheets

FIG. 6A
FIG. 6B
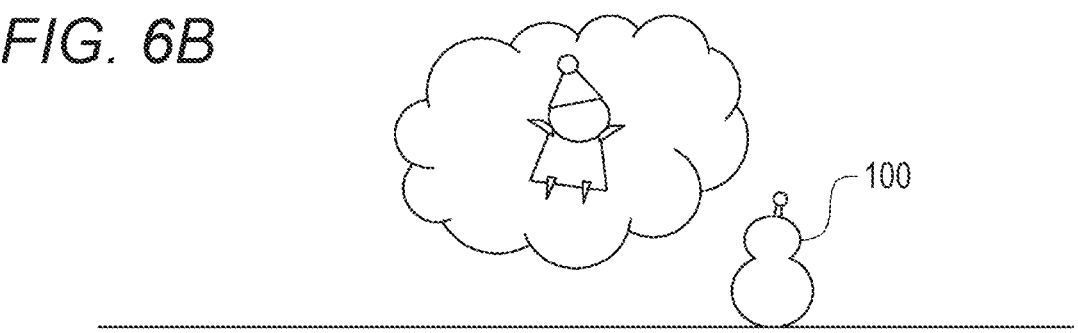
FIG. 6C
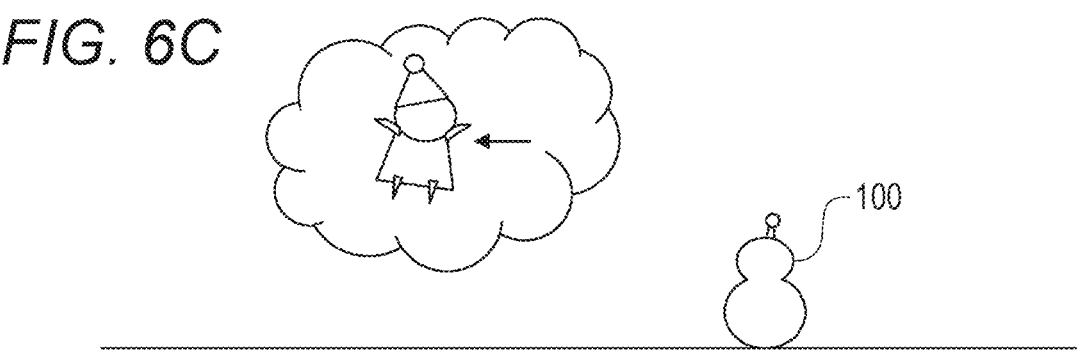
FIG. 6D
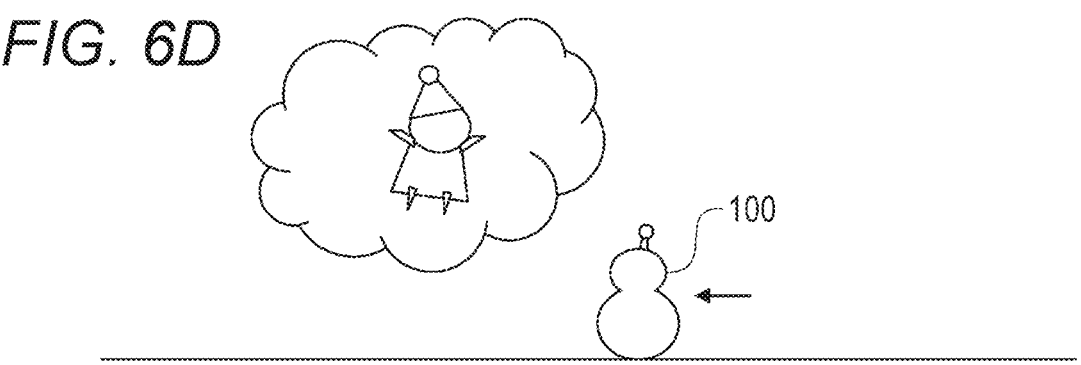

FIG. 7A
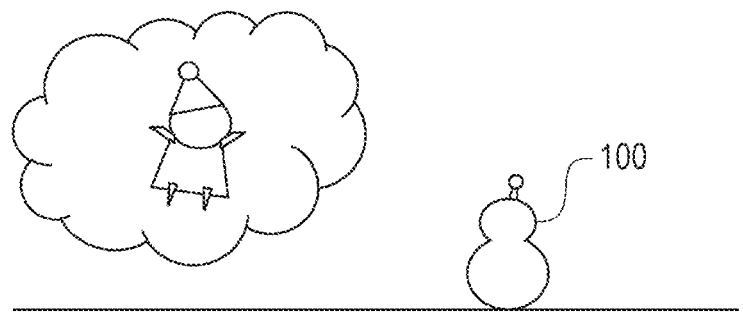
FIG. 7B
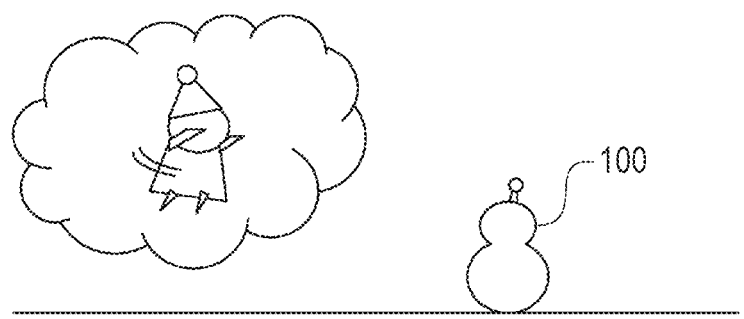
FIG. 7C
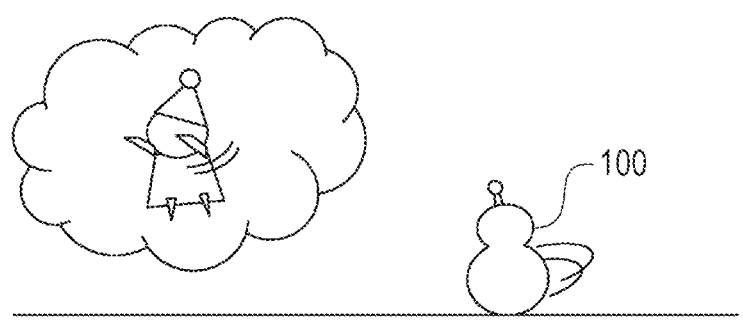

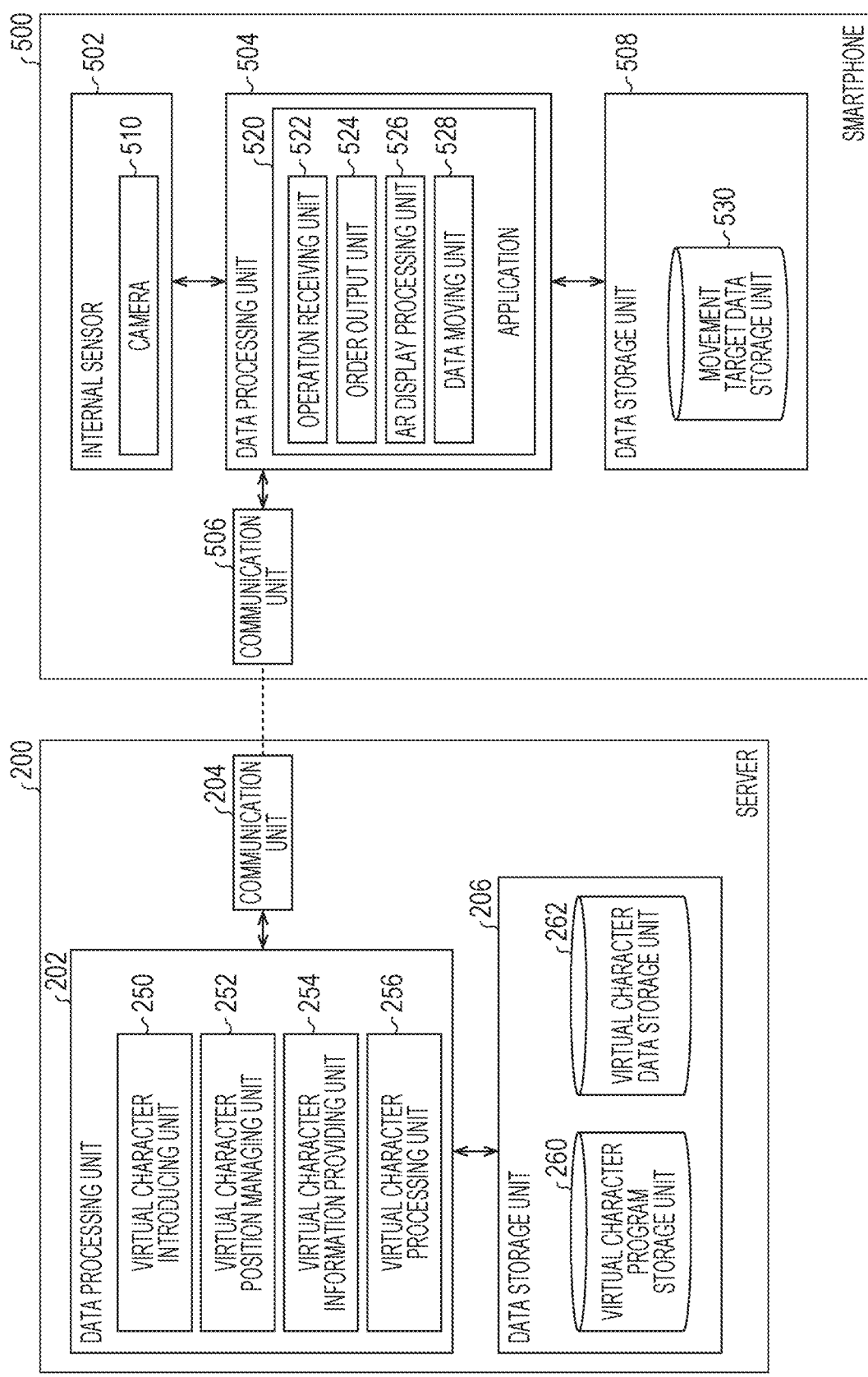

FIG. 11

| EVENT ID | EVENT TYPE | PARAMETER | COMPLETION FLAG |
|---|---|---|---|
| 1 | ENVIRONMENT EVENT | SITUATION TYPE: EXTREMELY HOT | ON |
| 2 | FAIRY POSITION NOTIFICATION EVENT | FAIRY VIRTUAL POSITION: (x1, y1, z1) | ON |
| 3 | FAIRY POSITION NOTIFICATION EVENT | FAIRY VIRTUAL POSITION: (x2, y2, z2) | ON |
| 4 | FAIRY POSITION NOTIFICATION EVENT | FAIRY VIRTUAL POSITION: (x3, y3, z3) | ON |
| . . . | . . . | . . . | . . . |
| 101 | FAIRY OPERATION NOTIFICATION EVENT | OPERATION TYPE: DANCE | ON |
| . . . | . . . | . . . | . . . |
| 201 | ROBOT ACTION ORDER EVENT | ACTION TYPE: APPROACH USER, USER ACTUAL POSITION: (X1, Y1, Z1) | OFF |

FIG. 14

| FAIRY ID | ROBOT ID | ... |
|---|---|---|
| F01 | NO SETTING | |
| F02 | R01 | ... |
| F03 | R02 | |
| ⋮ | ⋮ | |

440

AUTONOMOUSLY ACTING ROBOT THAT IMAGINES VIRTUAL CHARACTER

RELATED APPLICATIONS

The present application claims priority to Japanese Patent Application No. 2018-119717 filed Jun. 25, 2018, the disclosure of which is hereby incorporated by reference herein in its entirety.

BACKGROUND OF THE INVENTION

Field of the Invention

The present invention relates to a robot that autonomously selects an action.

Description of the Background Art

A human keeps a pet in a quest for solace. Meanwhile, for various reasons such as not being able to secure sufficient time to look after a pet, not having a living environment in which a pet can be kept, having an allergy, or hating the thought of being parted by death, there are many people who give up on keeping a pet. If there were a robot that performed the role of a pet, it may be that people who cannot keep a pet would also be provided with the kind of solace that a pet provides (refer to JP-A-2000-323219 and WO 2017/169826).

In the field of personal robot technology, a virtual personality may be set for a robot, and the robot caused to behave as though the personality is reflected in the robot. Because of this, a human more easily empathizes with the robot, and sympathy is obtained. A personality of a robot is realized by, for example, a program that carries out autonomous processing.

In principle, a robot having autonomy acts based on the robot's own judgment, but at times, a human feels a desire to intentionally cause this kind of robot to act.

However, a human being able to directly operate a robot is inconsistent with characteristics of a robot that should by rights act off the robot's own judgment.

Consequently, there is a demand for control such that a robot acts in accordance with a human's intention while autonomy of the robot is secured. When a human operates a robot, there is concern that a world view of an autonomously acting robot will collapse when the robot is directly targeted by a desire of the human.

SUMMARY OF THE INVENTION

The invention, having been completed based on a recognition of the heretofore described problem, has a main object of providing technology for introducing moderate heteronomy while respecting a concept of a robot that acts autonomously.

An autonomously acting robot in an aspect of the invention includes an actuality input system that acquires environment information relating to an actual space, a virtual reality input system that acquires an action order forwarded by a virtual character, an operation control unit that autonomously determines a first motion of the robot independently of the action order based on the environment information, and heteronomously determines a second motion of the robot in accordance with the action order, and a drive mechanism that executes the first motion and the second motion.

A robot control system in an aspect of the invention includes an autonomously acting robot, a user terminal, and a managing device. The autonomously acting robot includes an actuality input system into which environment information relating to an actual space is input, a virtual reality input system into which an action order forwarded by a virtual character is input, an operation control unit that autonomously determines a first motion of the robot based on the environment information, and heteronomously determines a second motion of the robot in accordance with the action order, and a drive mechanism that executes the first motion and the second motion. The user terminal includes an order output unit that outputs the action order the virtual character is to be caused to forward to the robot. The managing device includes a virtual character processing unit that controls the virtual character in the virtual space, and the virtual character processing unit forwards the action order output from the user terminal to the autonomously acting robot.

A user terminal in an aspect of the invention includes a camera that acquires a filmed image, a display processing unit that displays an augmented reality screen on which a virtual character is superimposed on the filmed image in accordance with a position of the virtual character in a virtual space, and an order output unit that outputs an action order the virtual character is to be caused to forward to a robot.

A managing device in an aspect of the invention includes a virtual character processing unit that controls a virtual character in a virtual space, and when the virtual character processing unit receives an action order the virtual character is to be caused to forward to an autonomously acting robot from a user terminal, the virtual character processing unit forwards the action order to the autonomously acting robot.

According to the aspects of the invention, moderate heteronomy can be introduced while respecting a concept of a robot that acts autonomously.

BRIEF DESCRIPTION OF THE DRAWINGS

FIGS. 6A to 6D are drawings showing aspects of the robot following a fairy;

FIGS. 7A to 7C are drawings showing aspects of the robot imitating a dance of the fairy;

FIG. 8 is a block diagram of fairy-related functions in a server and a smartphone;

FIG. 11 is a drawing showing an example of an event table;

FIG. 14 is a structural drawing showing one portion of fairy data;

DETAILED DESCRIPTION OF THE INVENTION

Figure 1:
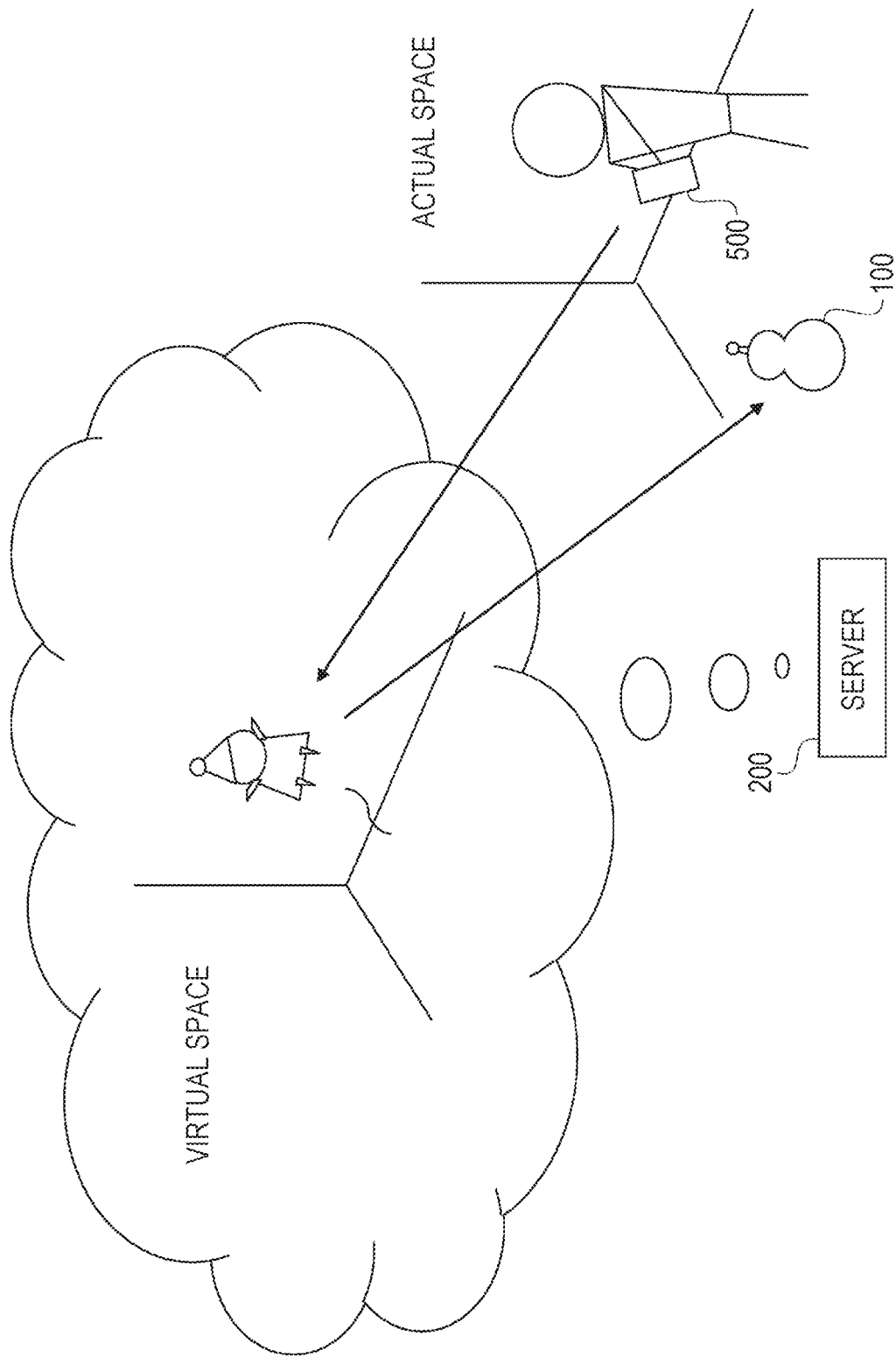
FIG. 1 is a schematic view for describing a concept of a robot that imagines a virtual space.

A situation in which a human attempts to operate an autonomously acting robot will be considered. For example, in addition to a robot acting autonomously, there may be a case in which a user wishes to encourage the robot to approach the user. In the same way, there may be a case in which the user wishes to cause the robot to take a photograph in accordance with an order from the user. Also, a developer of an application linked to a robot may wish to control an action of the robot in accordance with an order from the application. For example, an application having a function of posting a photograph taken by the robot to a social networking service (SNS) server is conceivable as an example of an application.

However, even when linking an autonomously acting robot to another device, autonomy, which is the concept of the robot, should not be excessively impeded. Therefore, the inventor proposes technology for introducing flexible heteronomy while respecting the concept of a robot that acts autonomously.

Because of this, a virtual character that acts as an intermediary between a user and a robot is introduced in this embodiment. The virtual character in this example is represented visually with a natural object such as an animal, an insect, a person, or a plant, or a man-made object such as a robot, a car, an airplane, or an item of furniture, as a motif. External characteristics, and internal characteristics such as a personality or a skill, are set for the virtual character, and behavior as the virtual character is determined in accordance with the characteristics. In the embodiment, a fairy, which appears as a spirit of a natural object in legends and stories, is used as the virtual character. Commonly, a fairy has an external appearance of a small person with wings, flies through the air, and is represented as a cute, good existence. The fairy in the embodiment also has an external appearance of a person that is smaller than a robot and has wings, flies freely through the air, and is set as an existence greatly liked by a robot. It is a precondition that the fairy is liked by a robot and obedient to a human.

The fairy being obedient to a human means that when a user instructs the fairy, the fairy moves as instructed. As a robot likes the fairy, the robot attempts to follow the fairy when the fairy moves. As the robot acts autonomously, the robot does not necessarily always follow the fairy, but there is a high probability of the robot following the fairy, which the robot likes. In this way, a user can moderately control a robot, although not completely, via the fairy intermediary. This kind of control is realized by incorporating instinctive behavior of approaching an existence with a high degree of familiarity in the robot, and setting familiarity felt by the robot toward the fairy to be higher than familiarity felt toward a human. Because of this, autonomy of a robot and a user's desire to dominate can be balanced, without destroying the world view of an autonomously acting robot.

Specifically, a virtual space recognized by a robot is set separately from an actual space in which the robot and a human exist. The robot exists in the actual space, and can also recognize the virtual space. The fairy exists in the virtual space, and can also recognize the actual space. The virtual space can be projected onto the actual space. One position in the virtual space corresponds to one position in the actual space, and the positions are mutually convertible. In a simple example, a correlation between the virtual space and the actual space is established by converting a coordinate system. That is, by superimposing the virtual space on the actual space and recognizing the spaces without distinction, the robot can behave exactly as though the fairy exists in the actual space.

FIG. 1 is a schematic view for describing a concept of a robot 100 that imagines a virtual space. In the embodiment, it is supposed that there is a virtual character in the virtual space. In addition to a case in which the robot 100 acts with an event based on data measured by the robot 100 itself as a trigger, there is also a case in which the robot 100 acts with an event based on a notification, an order, or the like, obtained from the virtual character as a trigger. As heretofore described, a fairy is an example of a virtual character, but the virtual character may be a character other than a fairy. Although the robot 100 is visible to a user, the fairy is not visible. By using a smartphone 500, however, a user can check the fairy using an augmented reality (AR) display. The robot 100 operates under an assumption that the fairy can be recognized. The virtual character is managed by a server 200.

Also, it is assumed that rather than a user directly causing the robot 100 to move, the user indirectly causes the robot 100 to move via the fairy. Hereafter, the significance of this will be described.

Although the fairy is not a physical existence, the fairy functions as an intermediary for communication between a robot and a human. When a human issues an order to the fairy, the fairy communicates the order to the robot 100. Further, when asking the fairy, which is favorably disposed, the robot 100 accepts the order and acts.

That is, rather than moving because of a request from a human, the robot 100 acts as a result of listening to a recommendation from the fairy. Although an action of the robot 100 is an action desired by a human, it is not the case that the robot 100 has directly obeyed an order from the human. By assuming that the robot 100 is obeying precisely because the order is an order received from the fairy in this way, an impression that the human can dominate the robot 100 is unlikely to arise. A feeling that "it's thanks to the fairy that I could control the robot 100", or "I can't order the robot 100 to act unless the fairy steps in", creates an impression that "this robot 100 doesn't just obey humans", and recognition relating to the autonomy of the robot 100 is maintained.

Assuming that the robot 100 could be directly ordered to act from a user terminal, that kind of robot 100 would be a normal machine that can be remotely operated, and a personality aspect would be lost. Also, assuming as another method that the robot 100 ordered to act from a user terminal obeys a direct order from a user as though on a whim, it may be that an identity of the robot 100 can be exhibited in one aspect. However, this kind of capricious robot 100 may be interpreted as being no more than a machine with poor responsiveness.

In the case of a method such that a human issues an order to the robot 100 via a fairy, as in the embodiment, the identity of the robot 100 is protected in that judgment by the robot 100 itself based on a relationship with the fairy intervenes, even though the robot 100 eventually obeys the order. Consequently, an impression of the robot 100 being submissive does not arise.

In the case of the embodiment, a user may feel "irritation" or "convolutedness" relating to the fact that contact cannot be made with the robot 100 unless the fairy intermediary is present. However, it can be said that this kind of feeling is in accordance with the original concept of the robot 100 being independent.

Even when the robot 100 obeys an order, this is because the robot 100 holds the intervening fairy in high trust, and is not an expression of submission to a human. As heretofore described, when an impression of domination by a human is eliminated, the personality (identity) of the robot 100 is respected, and a human easily sympathizes with the robot 100.

Continuing, an outline of an operation will be described. Firstly, a user introduces the fairy into the virtual space by operating the smartphone 500. The fairy introduced into the virtual space cannot be visually recognized with the naked eye, but can be visually recognized using an AR display on the smartphone 500. That is, a user interface wherein the fairy projected from the virtual space into the actual space is displayed superimposed on a background image is realized. There may be a multiple of introduced fairies. Also, visual recognition using an AR display may be carried out simultaneously on a multiple of smartphones 500.

After the fairy is introduced, the user can issue various instructions to the fairy by operating the smartphone 500. Herein, it is assumed that an instruction causing an order for action to the robot 100 (hereafter called a robot action order) to be forwarded is issued.

Data conveyed from the fairy to the robot 100 during communication between the fairy and the robot 100 are mainly notifications or orders. These items of data can be analyzed using a comparatively simple process.

Meanwhile, data obtained from the actual space by the robot 100 are mainly data measured by an internal sensor. In addition to numerical data such as temperature, brightness, and sound volume, the measured data are data such as an image or a voice. Data obtained from the actual space are a subject of a comparatively sophisticated recognition process. A result of the recognition may form a trigger for the robot 100 to act autonomously.

Also, it is supposed that the robot 100 and the fairy recognize each other's identity. The robot 100 and the fairy carry out their own judgment while respecting the other. Although the two are independent of each other, the robot 100 may be conscious of the fairy when acting. For example, the robot 100 may approach an actual position into which a virtual position of the fairy is projected. Conversely, the fairy may be conscious of the robot 100 when acting. For example, it is conceivable that the fairy moves so that the fairy's own virtual position is projected near to the robot 100.

The robot 100 and the fairy may relay messages to each other. That is, the robot 100 speaking to the fairy and the fairy speaking to the robot 100 are conceivable. Also, the fairy may convey a message as an intermediary between the robot 100 and a user. When the fairy and the robot 100 carry out a communication action, the robot 100 drives a body in accordance with the communication action, thereby executing an appropriate motion. At this time, the user can understand the meaning of the motion by watching the robot 100 via the smartphone 500, but cannot understand the meaning of the motion by watching the robot 100 directly.

The robot 100 includes a parameter indicating emotion. When in a good mood, the robot 100 responds well to a notification or an order from the fairy. Conversely, when in a bad mood, the robot 100 shows little response to a notification or an order. In this example, an emotion parameter indicating an emotional state of the robot 100 is used, but a detailed description will be given hereafter. In the embodiment, as heretofore described, a world view of the robot 100 wherein a virtual, space and an actual space are fused is provided.

Hereafter, a basic configuration of the robot 100 will be described in connection with FIGS. 2 to 5, after which an implementation method relating to control and application of the fairy in the embodiment will be described.

Basic Configuration

Figure 2A:
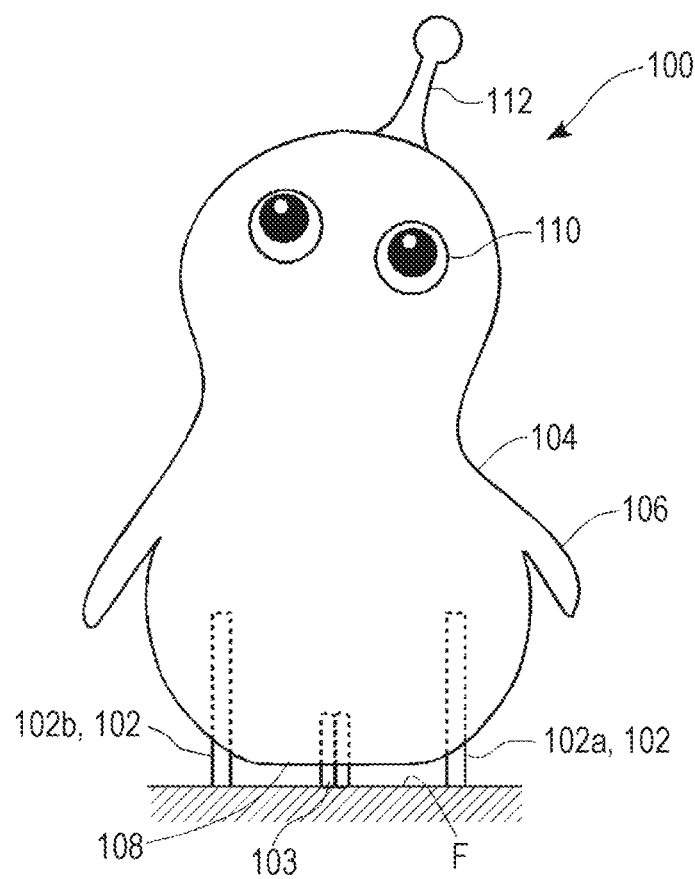
FIG. 2A is a front external view of the robot.
Figure 2B:
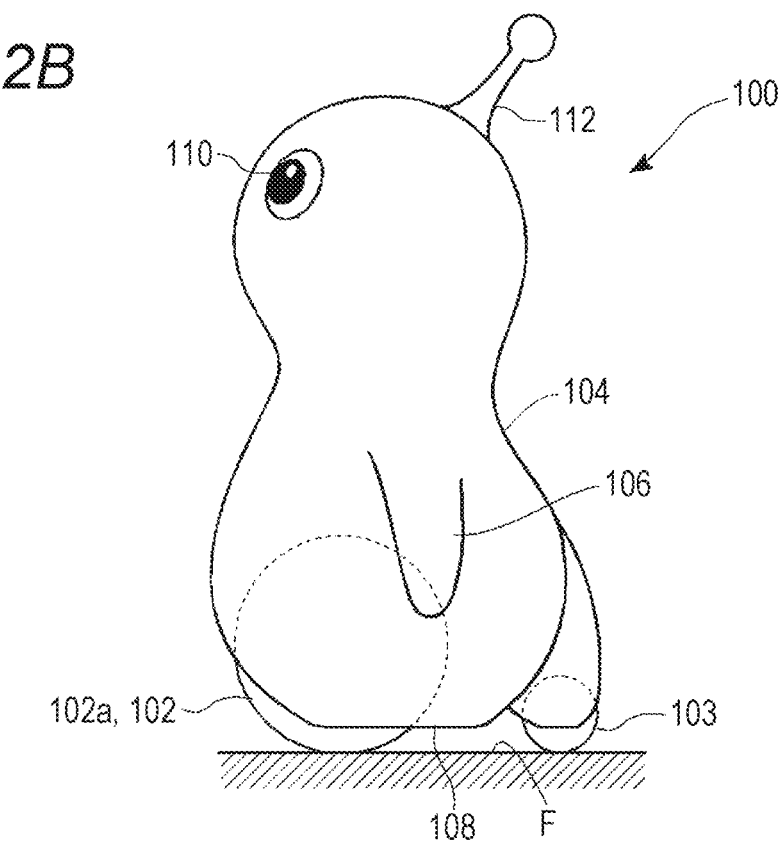
FIG. 2B is a side external view of the robot.

FIG. 2A is a front external view of the robot 100. FIG. 2B is a side external view of the robot 100.

The robot 100 in this embodiment is an autonomously acting robot that determines an action based on an external environment and an internal state. The external environment is recognized using various kinds of sensor, such as a camera or a thermosensor. The internal state is quantified as various parameters that express emotions of the robot 100. The robot 100 has an interior of an owner's home as an action range. Hereafter, a human involved with the robot 100 will be called a "user".

A body 104 of the robot 100 has a rounded form all over, and includes an outer skin formed of a soft material having elasticity, such as urethane, rubber, a resin, or a fiber. The robot 100 may be clothed. A total weight of the robot 100 is in the region of 5 to 15 kilograms, and a height is in the region of 0.5 to 1.2 meters. Advantages of a user holding the robot 100 easily, and wanting to hold the robot 100, are realized by the attributes of appropriate weight and roundness, softness, and pleasantness of touch.

The robot 100 includes a pair of front wheels 102 (a left wheel 102a and a right wheel 102b) and one rear wheel 103. The front wheels 102 are drive wheels, and the rear wheel 103 is a driven wheel. Although the front wheels 102 have no steering mechanism, rotational speed and a direction of rotation can be individually controlled. The rear wheel 103 is a caster, and rotates freely in order to cause the robot 100 to move forward and back, and left and right. The rear wheel 103 may also be an omni wheel.

The front wheels 102 and the rear wheel 103 can be completely housed in the body 104 using a drive mechanism (a pivoting mechanism and a linking mechanism). A greater portion of each wheel is hidden by the body 104 when traveling too, but when each wheel is completely housed in the body 104, the robot 100 is in a state of being unable to move. That is, the body 104 descends, and sits on a floor surface F, in accompaniment to an operation of the wheels being housed. In the sitting state, a flat seating face 108 (a ground bottom face) formed in a bottom portion of the body 104 comes into contact with the floor surface F.

The robot 100 has two arms 106. The arms 106 do not have a function of gripping an object. The arms 106 can perform simple actions such as raising, waving, and oscillating. The two arms 106 can also be controlled individually.

An eye 110 is capable of an image display using a liquid crystal element or an organic EL element. Various sensors, such as a microphone array or an ultrasonic sensor that can identify a direction of a sound source, are mounted in the robot 100. Also, a speaker is incorporated, and the robot 100 is also capable of simple speech.

A horn 112 is attached to a head portion of the robot 100. As the robot 100 is lightweight, as heretofore described, a user can also lift up the robot 100 by grasping the horn 112. An omnidirectional camera is attached to the horn 112, and can film a whole of a region above the robot 100 at one time.

Figure 3:
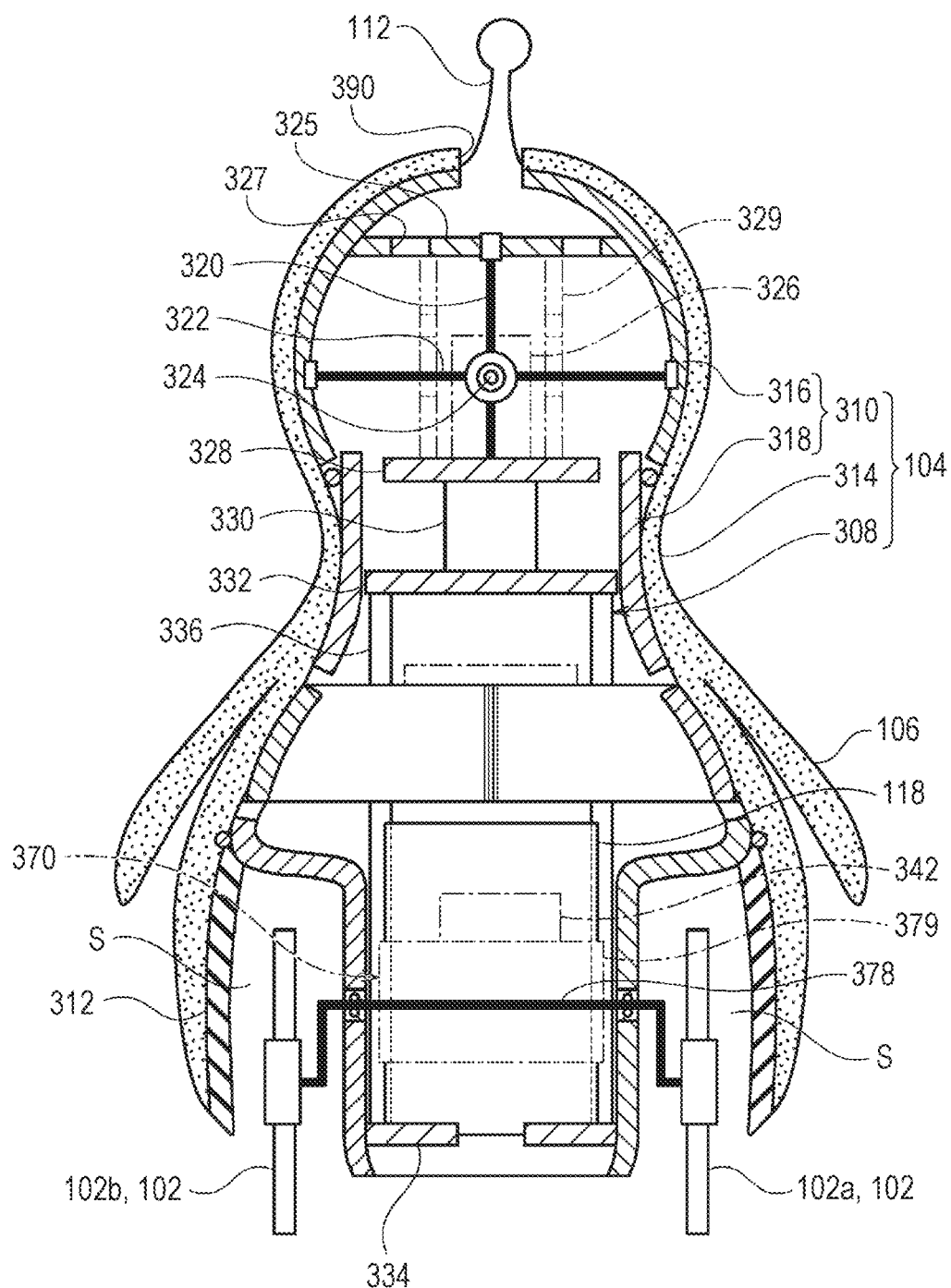
FIG. 3 is a sectional view schematically representing a structure of the robot.

FIG. 3 is a sectional view schematically representing a structure of the robot 100.

As shown in FIG. 3, the body 104 of the robot 100 includes a base frame 308, a main body frame 310, a pair of wheel covers 312 made of resin, and an outer skin 314. The base frame 308 is formed of metal, and supports an internal mechanism together with configuring a shaft of the body 104. The base frame 308 is configured by an upper plate 332 and a lower plate 334 being linked vertically by a multiple of side plates 336. A sufficient interval is provided between the multiple of side plates 336 so that ventilation can be carried out. A battery 118, a control circuit 342, and various kinds of actuator are housed inside the base frame 308.

The main body frame 310 is formed of a resin material, and includes a head portion frame 316 and a trunk portion frame 318. The head portion frame 316 is of a hollow hemispherical form, and forms a head portion framework of the robot 100. The trunk portion frame 318 is of a stepped cylindrical form, and forms a trunk portion framework of the robot 100. The trunk portion frame 318 is integrally fixed to the base frame 308. The head portion frame 316 is attached to an upper end portion of the trunk portion frame 318 so as to be relatively displaceable.

Three shafts, those being a yaw shaft 320, a pitch shaft 322, and a roll shaft 324, and an actuator 326 for driving each shaft so as to rotate, are provided in the head portion frame 316. The actuator 326 includes a multiple of servo motors for driving each shaft individually. The yaw shaft 320 is driven for a head shaking action, the pitch shaft 322 is driven for a nodding action, and the roll shaft 324 is driven for a head tilting action.

A plate 325 that supports the yaw shaft 320 is fixed to an upper portion of the head portion frame 316. A multiple of ventilation holes 327 for securing ventilation between upper and lower portions are formed in the plate 325.

A base plate 328 made of metal is provided so as to support the head portion frame 316 and an internal mechanism thereof from below. The base plate 328 is linked to the plate 325 via a crosslink mechanism 329 (a pantograph mechanism), and is linked to the upper plate 332 (the base frame 308) via a joint 330.

The trunk portion frame 318 houses the base frame 308 and a wheel drive mechanism 370. The wheel drive mechanism 370 includes a pivot shaft 378 and an actuator 379. A lower half portion of the trunk portion frame 318 is of a small width in order to form a housing space S of the front wheel 102 between the wheel covers 312.

The outer skin 314 is formed of urethane rubber, and covers the main body frame 310 and the wheel covers 312 from an outer side. The arms 106 are molded integrally with the outer skin 314. An aperture portion 390 for introducing external air is provided in an upper end portion of the outer skin 314.

Figure 4:
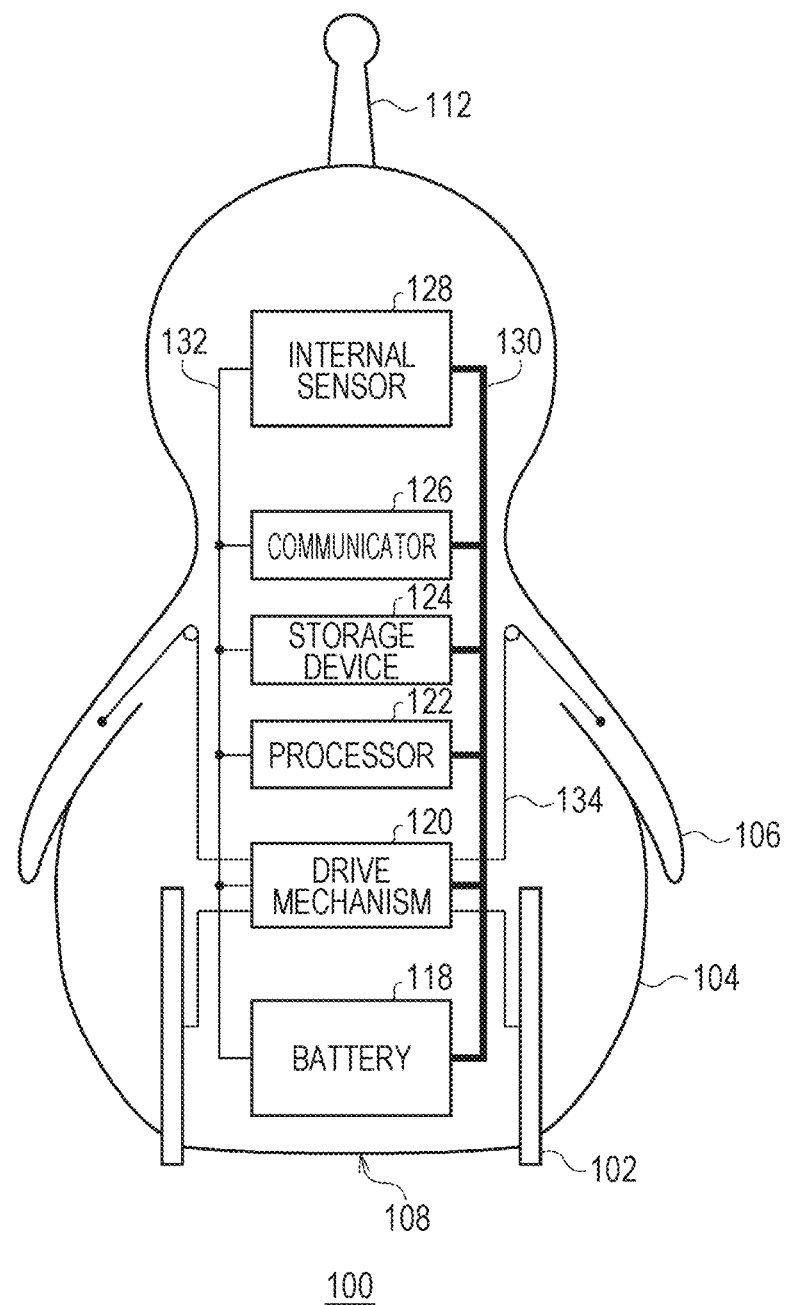
FIG. 4 is a hardware configuration diagram of the robot in a basic configuration.

FIG. 4 is a hardware configuration diagram of the robot 100.

The robot 100 includes an internal sensor 128, a communicator 126, a storage device 124, a processor 122, a drive mechanism 120, and the battery 118. The processor 122 and the storage device 124 are included in the control circuit 342. The units are connected to each other by a power line 130 and a signal line 132. The battery 118 supplies power to each unit via the power line 130. Each unit transmits and receives a control signal via the signal line 132. The battery 118 is a lithium ion rechargeable battery, and is a power source of the robot 100.

The internal sensor 123 is a collection of various kinds of sensor incorporated in the robot 100. Specifically, the internal sensor 128 is a camera (an omnidirectional camera), a microphone array, a distance sensor (infrared sensor), a thermosensor, a touch sensor, an acceleration sensor, a smell sensor, and the like. The touch sensor is installed between the outer skin 314 and the main body frame 310, and detects a touch by a user. The smell sensor is an already-known sensor that applies a principle such that electrical resistance changes in accordance with an adsorption of molecules that form a source of a smell.

The communicator 126 is a communication module that carries out wireless communication with various kinds of external device as a target. The storage device 124 is configured of a non-volatile memory and a volatile memory, and stores a computer program and various kinds of setting information. The processor 122 is means of executing a computer program. The drive mechanism 120 includes a multiple of actuators and the wheel drive mechanism 370. In addition to this, an indicator, a speaker, and the like are also mounted.

The drive mechanism 120 mainly controls the wheel (the front wheel 102) and the head portion (the head portion frame 316). The drive mechanism 120 changes a direction of movement and a movement speed of the robot 100, and can also raise and lower the wheels (the front wheel 102 and the rear wheel 103). When the wheels rise, the wheels are completely housed in the body 104, and the robot 100 comes into contact with the floor surface F via the seating face 108, taking on the sitting state. Also, the drive mechanism 120 controls the arm 106 via a wire 135.

Figure 5:
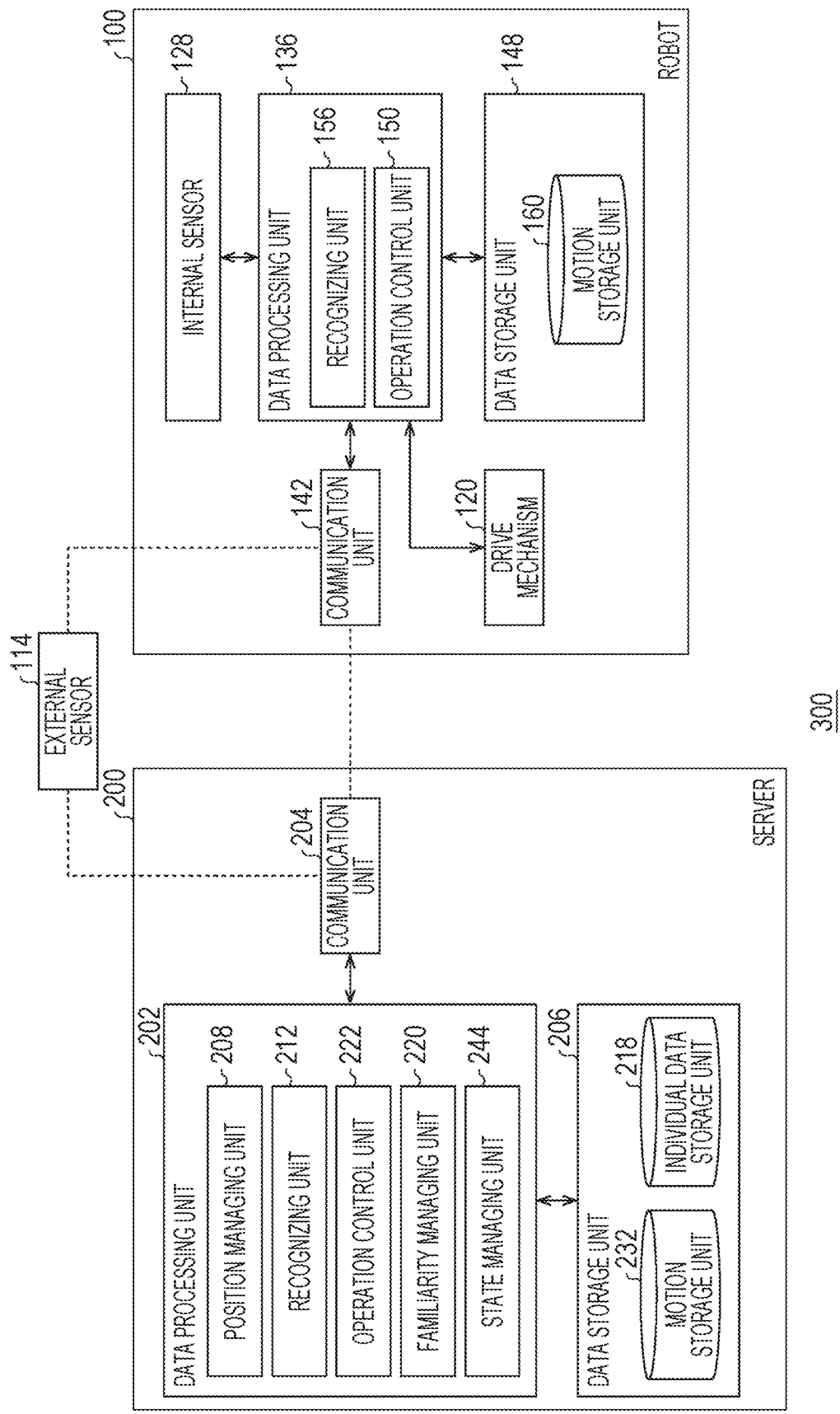
FIG. 5 is a functional block diagram of a robot system.

FIG. 5 is a functional block diagram of a robot system 300.

The robot system 300 includes the robot 100, the server 200, and the multiple of external sensors 114. Each component of the robot 100 and the server 200 is realized by hardware including a computer formed of a central processing unit (CPU), various kinds of coprocessor, and the like, a storage device that is a memory or storage, and a wired or wireless communication line that links the computer and the storage device, and software that is stored in the storage device and supplies a processing order to the computer. A computer program may be configured of a device driver, an operating system, various kinds of application program positioned in an upper layer thereof, and a library that provides a common function to the programs. Each block described hereafter indicates a functional unit block rather than a hardware unit configuration.

One portion of the functions of the robot 100 may be realized by the server 200, and one portion or all of the functions of the server 200 may be realized by the robot 100.

The multiple of external sensors 114 are installed in advance in a house. Positional coordinates of the external sensor 114 are registered in the server 200. The server 200 determines a basic action of the robot 100 based on information obtained from the internal sensor 128 of the robot 100 and the multiple of external sensors 114. The external sensor 114 is for reinforcing sensory organs of the robot 100, and the server 200 is for reinforcing brainpower of the robot 100. The communicator 126 of the robot 100 communicates regularly with the external sensor 114, and the server 200 identifies a position of the robot 100 using the external sensor 114 (refer also to WO 2017/169826).

Server 200

The server 200 includes a communication unit 204, a data processing unit 202, and a data storage unit 206.

The communication unit 204 manages a process of communicating with the external sensor 114 and the robot 100. The data storage unit 206 stores various kinds of data. The data processing unit 202 executes various kinds of process based on data acquired by the communication unit 204 and data stored in the data storage unit 206. The data processing unit 202 also functions as an interface of the communication unit 204 and the data storage unit 206.

The data storage unit 206 includes a motion storage unit 232 and an individual data storage unit 218.

The robot 100 has a multiple of operation patterns (motions). Various motions, such as waving the arm 106, approaching an owner while winding, and watching an owner closely with the head tilted, are defined.

The motion storage unit 232 stores a "motion file" that defines control details of a motion. Each motion is identified by motion ID. The motion file is also downloaded into a motion storage unit 160 of the robot 100. Which motion is to be executed may be determined by the server 200, or may be determined by the robot 100.

Many motions of the robot 100 are configured as compound motions that include a multiple of unit motions. For example, when the robot 100 approaches an owner, the approach may be expressed as a combination of a unit motion of changing direction to face the owner, a unit motion of approaching while raising an arm, a unit motion of approaching while shaking the body, and a unit motion of sitting while raising both arms. By combining these kinds of four motions, a motion of "approaching an owner, raising an arm on the way, and finally sitting after shaking the body" is realized. An angle of rotation, angular velocity, and the like of an actuator provided in the robot 100 is defined correlated to a time axis in a motion file. Various motions are performed by each actuator being controlled together with the passing of time in accordance with the motion file (actuator control information).

A shift time when changing from a preceding unit motion to a subsequent unit motion is called an "interval". It is sufficient that an interval is defined in accordance with time needed for a unit motion change or details of a motion. A length of an interval can be regulated.

Hereafter, settings relating to controlling behavior of the robot 100, such as which motion is chosen and when, and regulating output of each actuator when a motion is realized, will collectively be called "behavioral characteristics". The behavioral characteristics of the robot 100 are defined by a motion selection algorithm, a motion selection probability, a motion file, and the like.

In addition to a motion file, the motion storage unit 232 stores a motion selection table that defines motions that should be executed when various kinds of event occur. One or more motions, and selection probabilities thereof, are correlated to an event in the motion selection table.

The individual data storage unit 218 stores information on a user. Specifically, the individual data storage unit 218 stores master information indicating familiarity toward a user, and physical characteristics and behavioral characteristics of the user. The individual data storage unit 218 may also store attribute information such as age and gender.

The robot 100 has an internal parameter of familiarity for each user. When the robot 100 recognizes an action indicating goodwill toward the robot 100, such as hugging and lifting the robot 100 or speaking to the robot 100, familiarity with respect to that user increases. Familiarity decreases with respect to a user not involved with the robot 100, a user who uses violence, or an infrequently met user.

The data processing unit 202 includes a position managing unit 208, a recognizing unit 212, an operation control unit 222, a familiarity managing unit 220, and a state managing unit 244.

The position managing unit 208 identifies positional coordinates of the robot 100. The state managing unit 244 manages various kinds of internal parameter such as a charging rate, an internal temperature, and various kinds of physical state such as a processing load of the processor 122. Also, the state managing unit 244 manages various emotion parameters indicating emotions (loneliness, curiosity, a desire for approval, and the like) of the robot 100. These emotion parameters constantly fluctuate. A movement target point of the robot 100 changes in accordance with the emotion parameters. For example, when loneliness increases, the robot 100 sets a place where a user is as the movement target point.

The emotion parameters change in accordance with the passing of time. Also, each kind of emotion parameter also changes in accordance with a response action to be described hereafter. For example, the emotion parameter indicating loneliness decreases when the robot 100 is "hugged" by an owner, and the emotion parameter indicating loneliness increases little by little when the robot 100 does not visually recognize an owner for a long time.

The recognizing unit 212 recognizes an external environment. Various kinds of recognition, such as recognition of weather or season based on temperature and humidity, and recognition of shelter (a safe area) based on an amount of light and temperature, are included in the recognition of the external environment. The recognizing unit 156 of the robot 100 acquires various kinds of environmental information using the internal sensor 128, and after carrying out a primary processing of the environmental information, transfers the environmental information to the recognizing unit 212 of the server 200.

Specifically, the recognizing unit 156 of the robot 100 extracts an image region corresponding to a moving object, particularly a person or an animal, from an image, and extracts a "feature vector" as a collection of feature quantities indicating physical characteristics and behavioral characteristics of the moving object from the extracted image region. A feature vector component (feature quantity) is a numeral wherein various kinds of physical and behavioral characteristic are quantified. For example, a horizontal width of a human eye is quantified in a range of 0 to 1, forming one feature vector component. Already-known facial recognition technology is applied as a method of extracting a feature vector from a filmed image of a person. The robot 100 transmits the feature vector to the server 200.

The recognizing unit 212 of the server 200 determines what person a filmed user corresponds to by comparing a feature vector extracted from an image filmed by the camera incorporated in the robot 100 and a feature vector of a user (cluster) registered in advance in the individual data storage unit 218 (a user identification process). Also, the recognizing unit 212 infers an emotion of a user by carrying out image recognition of an expression of the user. The recognizing unit 212 also carries out a user recognition process on a moving object other than a person, for example, a cat or a dog that is a pet.

The recognizing unit 212 recognizes various responsive actions performed with respect to the robot 100, and classifies the actions as pleasant or unpleasant actions. Also, the recognizing unit 212 recognizes a responsive action of an owner with respect to an action of the robot 100, thereby classifying the responsive action as a positive or negative response. Pleasant and unpleasant actions are distinguished depending on whether a responsive action of a user is pleasing or unpleasant for an animal. For example, being hugged is a pleasant action for the robot 100, and being kicked is an unpleasant action for the robot 100. Positive and negative responses are distinguished depending on whether a responsive action of a user indicates a pleasant emotion or an unpleasant emotion of the user. Being hugged is a positive response indicating a pleasant emotion of the user, and being kicked is a negative response indicating an unpleasant emotion of the user.

The operation control unit 222 of the server 200 determines motions of the robot 100 in cooperation with an operation control unit 150 of the robot 100. The operation control unit 222 of the server 200 compiles a movement target point of the robot 100, and a movement route for the movement target point. The operation control unit 222 compiles a multiple of movement routes, and having done so, may select any of the movement routes.

The operation control unit 222 selects a motion of the robot 100 from a multiple of motions of the motion storage unit 232. A selection probability is correlated to each motion for each situation. For example, a selection method such that a motion A is executed with a 20% probability when a pleasant action is performed by an owner, and a motion B is executed with a 5% probability when a temperature reaches 30 degrees or higher, is defined.

The familiarity managing unit 220 manages familiarity for each user. As heretofore described, familiarity is registered as one portion of individual data in the individual data storage unit 218. When a pleasant action is detected, the familiarity managing unit 220 increases familiarity with respect to that user. When an unpleasant action is detected, the familiarity managing unit 220 reduces familiarity. Also, familiarity of an owner who has not been visually recognized for a long period gradually decreases.

Robot 100

The robot 100 includes a communication unit 142, a data processing unit 136, a data storage unit 148, the internal sensor 128, and the drive mechanism 120.

The communication unit 142 corresponds to the communicator 126 (refer to FIG. 4), and manages a process of communicating with the external sensor 114, the server 200, and another robot 100. The data storage unit 148 stores various kinds of data. The data storage unit 148 corresponds to the storage device 124 (refer to FIG. 4). The data processing unit 136 executes various kinds of process based on data acquired by the communication unit 142 and data stored in the data storage unit 148. The data processing unit 136 corresponds to the processor 122 and a computer program executed by the processor 122. The data processing unit 136 also functions as an interface of the communication unit 142, the internal sensor 128, the drive mechanism 120, and the data storage unit 148.

The data storage unit 148 includes the motion storage unit 160, which defines various kinds of motion of the robot 100.

Various kinds of motion file are downloaded from the motion storage unit 232 of the server 200 into the motion storage unit 160 of the robot 100. A motion is identified by motion ID. An operating timing, an operating time, an operating direction, and the like, of the various kinds of actuator (the drive mechanism 120) are defined chronologically in the motion file in order to perform various motions such as sitting by housing the front wheels 102, raising the arm 106, causing the robot 100 to carry out a rotating action by causing the two front wheels 102 to rotate in reverse or by causing only one front wheel 102 to rotate, shaking by causing the front wheels 102 to rotate in a state in which the front wheels 102 are housed, or stopping once and looking back when moving away from a user.

Various kinds of data may also be downloaded from the individual data storage unit 218 into the data storage unit 148.

The data processing unit 136 includes the recognizing unit 156 and the operation control unit 150.

The operation control unit 150 of the robot 100 determines motions of the robot 100 in cooperation with the operation control unit 222 of the server 200. One portion of motions may be determined by the server 200, and other motions may be determined by the robot 100. Also, a configuration may be such that although the robot 100 determines motions, the server 200 determines a motion when a processing load of the robot 100 is high. A configuration may be such that a motion forming a base is determined by the server 200, and an additional motion is determined by the robot 100. It is sufficient that the way a motion determining process is divided between the server 200 and the robot 100 is designed in accordance with specifications of the robot system 300.

The operation control unit 150 of the robot 100 instructs the drive mechanism 120 to execute the selected motion. The drive mechanism 120 controls each actuator according to the motion file.

The operation control unit 150 can also execute a motion of holding up both arms 106 as a gesture asking for "a hug" when a user with a high degree of familiarity is nearby, and can also perform a motion of no longer wanting to be hugged by causing the left and right front wheels 102 to rotate in reverse in a housed state when bored of the "hug". The drive mechanism 120 causes the robot 100 to perform various motions by driving the front wheel 102, the arm 106, and the head (the head portion frame 316) in accordance with an instruction from the operation control unit 150.

The recognizing unit 156 of the robot 100 analyzes external information obtained from the internal sensor 128. The recognizing unit 156 is capable of visual recognition (a visual unit), smell recognition (an olfactory unit), sound recognition (an aural unit), and tactile recognition (a tactile unit).

The recognizing unit 156 extracts a feature vector from a filmed image of a moving object. As heretofore described, a feature vector is a collection of parameters (feature quantities) indicating physical characteristics and behavioral characteristics of a moving object. When a moving object is detected, physical characteristics and behavioral characteristics are also extracted from the smell sensor, an incorporated highly directional microphone, a temperature sensor, and the like. These characteristics are also quantified, forming feature vector components. The recognizing unit 156 identifies a user from a feature vector based on already-known technology described in WO 2017/169826.

Of a series of recognition processes including detecting, analyzing, and determining, the recognizing unit 156 of the robot 100 carries out a selection and extraction of information necessary for recognition, and an analyzing process such as determining is executed by the recognizing unit 212 of the server 200. The recognition processes may be carried out by the recognizing unit 212 of the server 200 alone, or carried out by the recognizing unit 156 of the robot 100 alone, or the two may execute the recognition processes while dividing roles as heretofore described.

When a strong force is applied to the robot 100, the recognizing unit 156 recognizes this using the touch sensor and the acceleration sensor, and the recognizing unit 212 of the server 200 recognizes that a "violent action" has been performed by a user in the vicinity. When a user picks the robot 100 up by grabbing the horn 112, this may also be recognized as a violent action. When a user in a state of facing the robot 100 speaks in a specific volume region and a specific frequency band, the recognizing unit 212 of the server 200 may recognize that a "speaking action" has been performed with respect to the robot 100. Also, when a temperature in the region of body temperature is detected, the response recognizing unit 212 recognizes that a "touching action" has been performed by a user, and when upward acceleration is detected in a state in which touching is recognized, the recognizing unit 212 recognizes that a "hug" has been performed Physical contact when a user picks up the body 104 may also be sensed, and a hug may also be recognized by a load acting on the front wheels 102 decreasing.

To summarize, the robot 100 acquires an action of a user as physical information using the internal sensor 128, and the recognizing unit 212 of the server 200 determines whether the action is pleasant or unpleasant. Also, the recognizing unit 212 of the server 200 executes a user identification process based on the feature vector.

The recognizing unit 212 of the server 200 recognizes various kinds of response by a user toward the robot 100. "Pleasant" or "unpleasant", "positive" or "negative" is correlated to one portion of typical responsive actions among various kinds of responsive action. In general, almost all responsive actions that are pleasant actions are positive responses, and almost all responsive actions that are unpleasant actions are negative responses. Pleasant and unpleasant actions relate to familiarity, and positive and negative responses affect action selection of the robot 100.

The familiarity managing unit 220 of the server 200 changes the familiarity toward a user in accordance with a responsive action recognized by the recognizing unit 156. In principle, the familiarity toward a user who carries out a pleasant action increases, while the familiarity toward a user who carries out an unpleasant action decreases.

Next, with the heretofore described basic configuration as a precondition, a description will be given of an implementation of the robot 100, the server 200, and the smartphone 500 in the embodiment, centering particularly on characteristics and an object of the implementation, and differences from the basic configuration.

In the example, the robot 100 may perform a movement of following the fairy. FIGS. 6A to 6D are drawings showing aspects of the robot 100 following the fairy at time intervals. FIG. 6A shows a situation in which the fairy is not yet introduced into the virtual space. FIG. 6B shows a situation in which the fairy has been introduced into the virtual space. Although the fairy is not visible to a human, the robot 100 visually recognizes the fairy. The robot 100 is aware of the actual position into which the virtual position of the fairy is projected. FIG. 6C shows a situation in which the fairy has moved and is distanced from the robot 100. FIG. 6D shows an aspect of the robot 100 following the fairy that has moved. As the robot 100 attempts to follow the fairy, which the robot 100 likes, in this way, a user can induce the robot 100 to move to a target place by causing the fairy to move. That is, the existence of the fairy affects an internal parameter involved with an autonomous action determination of the robot 100, as a result of which the robot 100 is controlled.

Furthermore, the robot 100 may imitate an operation of the fairy. FIGS. 7A to 7C are drawings showing aspects of the robot 100 imitating a dance of the fairy at time intervals. The robot 100 imitating an operation of the fairy means controlling a position or a posture of each region, such as the head, the arm, and the leg, of the robot 100 so that the position or the posture of each region of the robot 100 corresponds with a position or a posture of each region, such as a head, an arm, and a leg, of the fairy. FIG. 7A shows a situation in which the fairy is not yet dancing. FIG. 7B shows a situation in which the fairy has started to dance. FIG. 7C shows a situation in which the robot 100 is seeing and mimicking an aspect of the fairy dancing. As the robot 100 attempts to mimic a movement or the fairy, which the robot 100 likes, in this way, a user can cause the robot 100 to behave in a desired way by causing the fairy to perform an instructional operation. In other words, the robot 100 temporarily learns a function of "dancing" owing to the existence of the fairy.

Fairy-Related Implementation

FIG. 8 is a block diagram of fairy-related functions in the server 200 and the smartphone 500. Of various kinds of function of the server 200, mainly those involved in linking with the smartphone 500 are shown in FIG. 8.

Server 200

The data processing unit. 202 of the server 200 in the embodiment includes a virtual character introducing unit 250, a virtual character position managing unit 252, a virtual character information providing unit 254, and a virtual character processing unit 256.

The virtual character introducing unit 250 carries out a process of introducing the fairy into the virtual space. Specifically, the virtual character introducing unit 250 loads a fairy program for controlling the fairy, and causes a f unction of the virtual character processing unit 256 to start. The fairy program is prepared for each fairy character. The virtual character introducing unit 250 selects from among the multiple of fairy programs, and loads the program. The fairy program holds information that determines the external appearance of the fairy, and identification information for identifying the fairy. The virtual character position managing unit 252 manages the position of the fairy in the virtual space. The virtual character information providing unit 254 provides the smartphone 500 and the robot 100 with information relating to the fairy. The virtual character processing unit 256 carries out control relating to the fairy.

The data storage unit. 206 of the server 200 in the embodiment includes a virtual character program storage unit 260 and a virtual character storage unit 262. The virtual character program storage unit 260 stores a fairy program. The virtual character storage unit 262 stores fairy data 440. The fairy data 440 will be described hereafter in connection with FIG. 14.

Smartphone 500

The smartphone 500 includes an internal sensor 502, a data processing unit 504, a communication unit 506, and a data storage unit 508. The internal sensor 502 includes a camera 510. The camera 510 films a background image used in, for example, an AR display.

The data processing unit 504 includes an operation receiving unit 522, an order output unit 524, an AR display processing unit 526, and a data moving unit 528. The operation receiving unit 522 receives an operation by a user using a touch panel. The order output unit 524 outputs a robot action order to be forwarded by the fairy. The AR display processing unit 526 carries out an AR display. The data moving unit 528 carries out a data moving process in a form to be described hereafter.

The communication unit 506 manages a process of communicating with an external device, for example, the server 200.

The data storage unit 508 is used for storing various kinds of data, and includes a movement target data storage unit 530. The movement target data storage unit 530 stores data that form a movement target using a data moving process in a form to be described hereafter.

Figure 9:
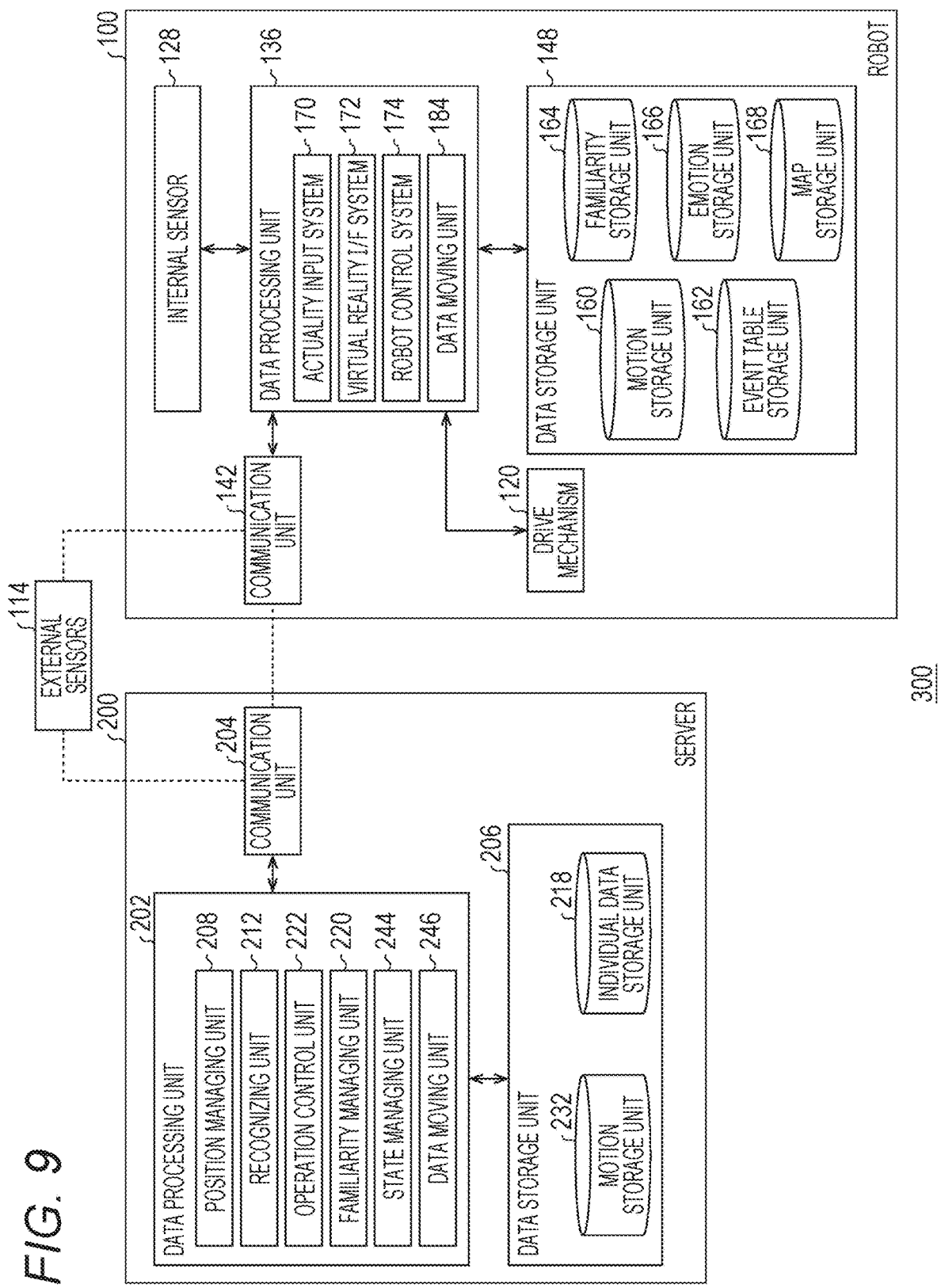
FIG. 9 is a functional block diagram of the robot system in an embodiment.

FIG. 9 is a functional block diagram of the robot system 300 in the embodiment. The server 200 shown in FIG. 9 is the same as the server 200 shown in FIG. 8.

Server 200

The data processing unit 202 of the server 200 in the embodiment further includes a data moving unit 246. The data moving unit 246 carries out a data moving process in a form to be described hereafter.

Robot 100

The data processing unit 136 of the robot 100 in the embodiment has an actuality input system 170, a virtual reality interface (I/F) system 172, a robot control system 174, and a data moving unit 184.

The actuality input system 170 acquires environmental information relating to the actual space. The virtual reality I/F system 172 is a data input/output interface with the virtual space. The robot control system 174 controls an action of the robot 100. The data moving unit 184 carries out a data moving process in a form to be described hereafter. The actuality input system 170, the virtual reality I/F system 172, and the robot control system 174 will be described hereafter in connection with FIG. 10.

The data storage unit 148 includes the motion storage unit 160, an event table storage unit 162, a familiarity storage unit 164, an emotion storage unit 166, and a map storage unit 168.

The motion storage unit 160 stores various kinds of motion file, as heretofore described. The event table storage unit 162 stores an event table. The event table will be described hereafter in connection with FIG. 11. The familiarity storage unit 164 stores familiarity with respect to a user and familiarity with respect to the fairy. The emotion storage unit 166 stores a parameter indicating an emotion of the robot 100. The map storage unit 168 stores a map showing a correlation of a virtual position and an actual position.

A functional unit block included in the data processing unit 202 of the server 200 may be provided in the data processing unit 136 of the robot 100. Specifically, a block equivalent to the position managing unit 208 included in the data processing unit 202 of the server 200 may be provided in the data processing unit 136 of the robot 100. A block equivalent to the familiarity managing unit 220 included in the data processing unit 202 of the server 200 may be provided in the data processing unit 136 of the robot 100. A block equivalent to the state managing unit 244 included in the data processing unit 202 of the server 200 may be provided in the data processing unit 136 of the robot 100. Also, a function of the recognizing unit 212 included in the data processing unit 202 of the server 200 may be managed in an actuality recognizing unit 154 included in the data processing unit 136 of the robot 100. A function of the operation control unit 222 included in the data processing unit 202 of the server 200 may be managed in the operation control unit 150 included in the data processing unit 136 of the robot 100. A storage unit equivalent to the individual data storage unit 218 included in the data storage unit 206 of the server 200 may be provided in the data storage unit 148 of the robot 100.

Continuing, details of the actuality input system 170, the virtual reality I/F system 172, and the robot control system 174 shown in FIG. 10 will be described.

The actuality input system 170 includes a measurement data input unit 152 and the actuality recognizing unit 154. The measurement data input unit 152 acquires data measured by the internal sensor 128. The actuality recognizing unit 154 generates an environment-related event (hereafter called an environment event) based on measurement data acquired by the measurement data input unit 152.

For example, when a temperature measured by the temperature sensor exceeds an upper limit value of an allowable range, the actuality recognizing unit 154 generates an environment event of "it's extremely hot". Also, when a sound volume detected by a microphone exceeds an upper limit value of an allowable range, the actuality recognizing unit 154 generates an environment event of "a loud noise has occurred". As an example accompanying a sophisticated determination, the actuality recognizing unit 154 generates an environment event of "Mr. A is here" based on an image filmed by the camera 510. Alternatively, the actuality recognizing unit 154 generates an environment event of "Mr. B is hugging me" based on a filmed image and a measured temperature. A generated environment event is added to the event table.

At this point, an example of the event table shown in FIG. 11 will be described. A record of an event ID:1 indicates an example of an environment event. Event ID, an event type, a parameter, and a completion flag are stored in a record in the event table. The parameter is details in accordance with the event type. An initial value of the completion flag is OFF, and this changes to ON at a point at which a process relating to the event is completed in the operation control unit 150. In addition to an event occurring in the actuality input system 170, an event occurring in a virtual reality input system 176 is also registered in the event table. FIG. 11 shows a state wherein events up to event ID:200 are already processed, and an event with event ID:201 is newly registered butt not yet processed. The operation control unit 150 does not need to process all events. For example, it is sufficient that events are selectively processed in accordance with the internal state of the robot 100.

Figure 10:
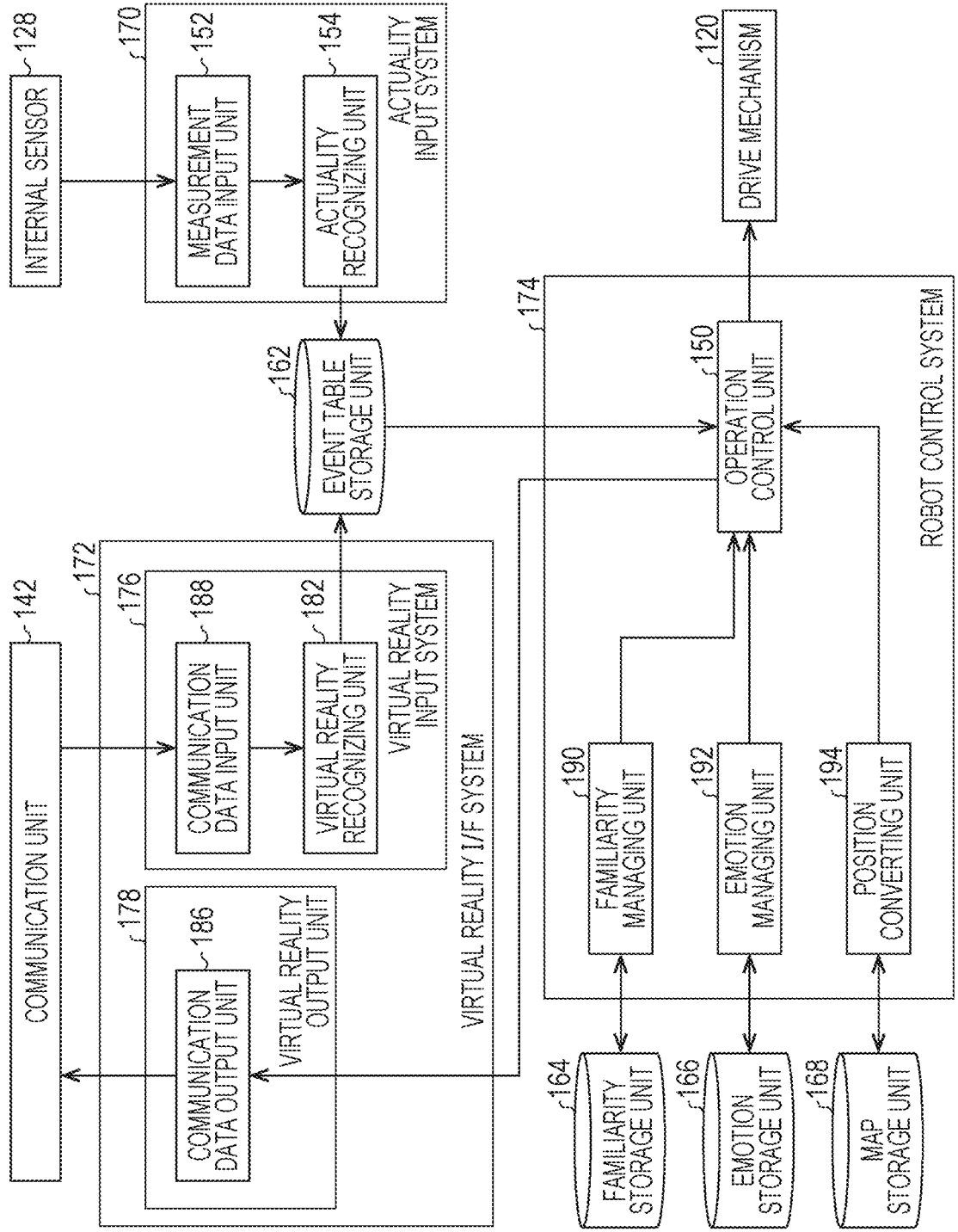
FIG. 10 is a drawing showing details of an actuality input system, a virtual reality I/F system, and a robot control system.

Returning to the description of FIG. 10, the virtual reality I/F system 172 includes the virtual reality input system 176. A notification or an order from the fairy is input into the virtual reality input system 176. Specifically, the notification or the order is input from the data processing unit 202 of the server 200 into the virtual reality input system 176. The virtual reality input system 176 has a communication data input unit 188 and a virtual reality recognizing unit 182. The communication data input unit 188 acquires communication data from the fairy via the communication unit 142. The virtual reality recognizing unit 182 recognizes details of communication data from the fairy. In this example, communication data from the fairy are one of a fairy position notification, a fairy operation notification, or a robot action order. A fairy position notification informs the robot 100 of the position of the fairy in the virtual space (the virtual position of the fairy). A fairy operation notification informs the robot 100 of an operation of the fairy in the virtual space. A robot action order is an order that causes the robot 100 to act.

A process of the virtual reality input system 176 shown in FIG. 12 will be described. The communication data input unit 188 acquires communication data from the fairy (S1). Then, the virtual reality recognizing unit 182 determines whether or not the acquired communication data are a fairy position notification (S2).

When the virtual reality recognizing unit 182 determines that the acquired communication data are a fairy position notification, a fairy position notification event is added to the event table, as in the records of event ID:2 to event ID:4 shown in FIG. 11 (S3). The parameter in a fairy position notification event is the virtual position of the fairy. As the fairy is floating up in the virtual space, fairy position notifications are sent in this way consecutively.

Figure 12:
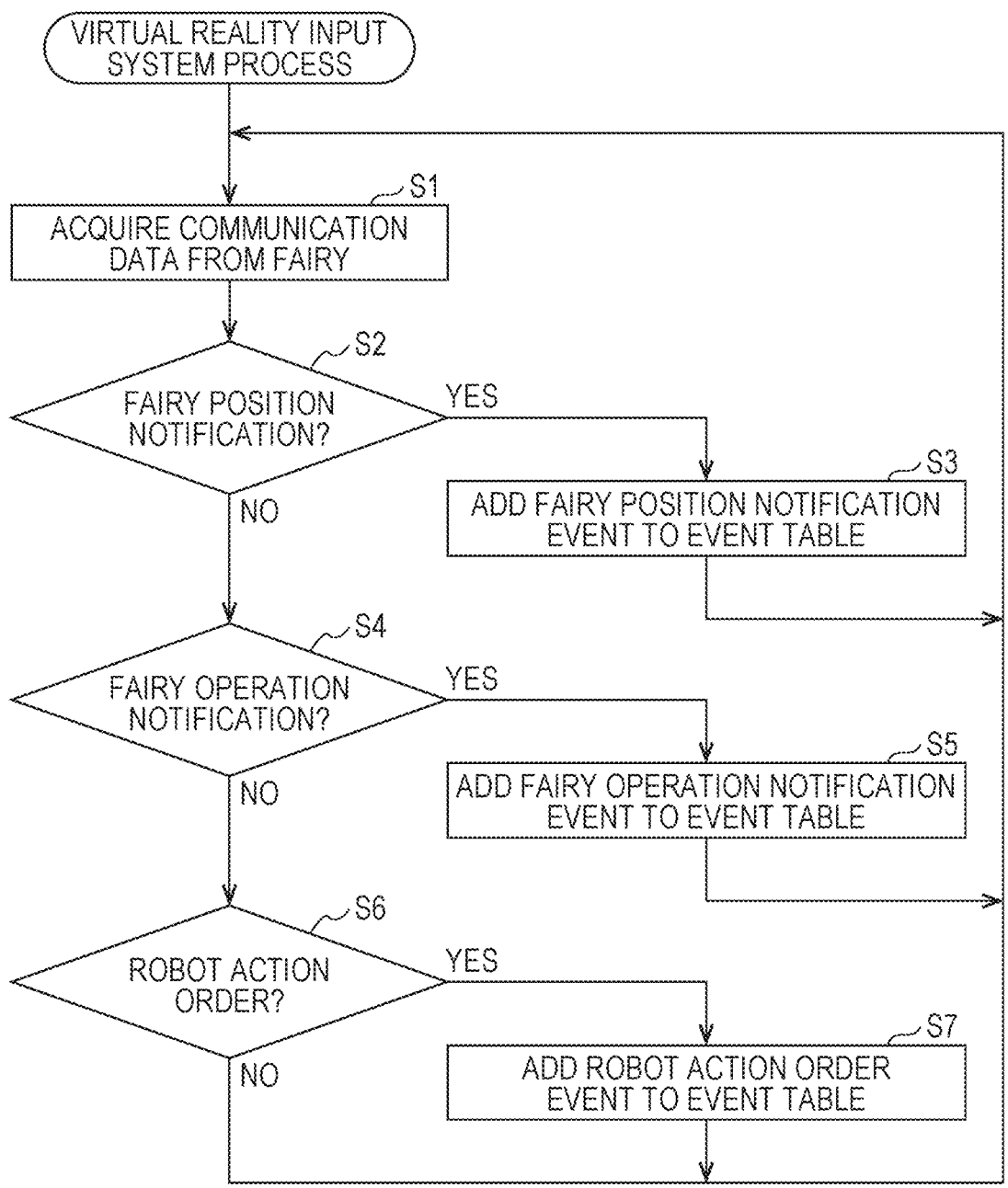
FIG. 12 is a flowchart showing a virtual reality input system process.

Returning to the description of FIG. 12, when the virtual reality recognizing unit 182 determines that the acquired communication data are not a fairy posit on notification, the virtual reality recognizing unit 182 determines whether or not the acquired communication data are a fairy operation notification (S4).

When the virtual reality recognizing unit 182 determines that the acquired communication data are a fairy operation notification, a fairy operation notification event is added to the event table, as in the record of event ID:101 shown in FIG. 11 (S5). The parameter in a fairy operation notification event is an operation type.

Meanwhile, when the virtual reality recognizing unit 182 determines that the acquired communication data are not a fairy operation notification, the virtual reality recognizing unit 182 determines whether or not the acquired communication data are a robot action order (S6).

When the virtual reality recognizing unit 182 determines that the acquired communication data are a robot action order, a robot action order event is added to the event table, as in the record of event ID:201 shown in FIG. 11 (S7). The parameter in a robot action order event is an action type. Also, when the action type is "approach a user", the current position of the user is also added to the parameter. Details of the added parameter depend on the action type.

When the virtual reality recognizing unit 182 determines that the acquired communication data are not a robot action order, the virtual reality recognizing unit 182 returns to the process of S1. Also, the virtual reality recognizing unit 182 also returns to the process of S1 after the processes of S3, S5, and S7.

Returning to the description of FIG. 10, the virtual reality I/F system 172 further includes a virtual reality output system 178. The virtual reality output system 178 outputs data to be sent to the virtual space. The virtual reality output system 173 includes a communication data output unit 186. The communication data output unit 186 outputs communication data to the fairy via the communication unit 142.

The robot control system 174 includes the operation control unit 150, a familiarity managing unit 190, an emotion managing unit 192, and a position converting unit 194. The operation control unit 150 determines a motion based on an event registered in the event table, and instructs the drive mechanism 120 to execute the determined motion.

The familiarity managing unit 190 manages familiarity with respect to a user and familiarity with respect to the fairy. The familiarity managing unit 190 adjusts the familiarity with respect to the fairy in accordance with, for example, a situation after a motion is executed in accordance with a robot action order. Alternatively, the familiarity managing unit 190 adjusts the familiarity with respect to the fairy in accordance with a situation after execution of a motion selected based on a fairy position notification or a fairy operation notification. That is, when the robot 100 enjoys a pleasant action by a user as a result of obeying the fairy, the familiarity managing unit 190 raises the familiarity with respect to the fairy. Meanwhile, when the robot 100 is subjected to an unpleasant action by a user, the familiarity managing unit 190 lowers the familiarity with respect to the fairy. Specifically, when a pleasant action is recognized by the actuality recognizing unit 154, the familiarity managing unit 190 increases the familiarity with respect to the fairy in the virtual space at the time. For example, when the actuality recognizing unit 154 determines that a response by a user corresponds to a pleasant action owing to the robot 100 being hugged by the user, the familiarity managing unit 190 adds a predetermined value to the familiarity with respect to the fairy. Conversely, when an unpleasant action is recognized by the actuality recognizing unit 154, the familiarity managing unit 190 reduces the familiarity with respect to the fairy in the virtual space at the time. For example, when the actuality recognizing unit 154 determines that a response by a user corresponds to an unpleasant action due to the robot 100 being subjected to violence by the user, the familiarity managing unit 190 subtracts a predetermined value from the familiarity with respect to the fairy.

In the same way as the state managing unit 244, the emotion managing unit 192 manages various emotion parameters indicating emotions (loneliness, curiosity, a desire for approval, quality of mood, and the like) of the robot 100. The emotion managing unit 192 adjusts an emotion parameter in accordance with, for example, a situation after a motion is executed in accordance with a robot action order. Alternatively, the emotion managing unit 192 adjusts an emotion parameter in accordance with a situation after execution of a motion selected based on a fairy position notification or a fairy operation notification. Specifically, when a pleasant action is recognized by the actuality recognizing unit 154, the emotion managing unit 192 increases a value of the parameter indicating quality of mood. For example, when the actuality recognizing unit 154 determines that a response by a user corresponds to a pleasant, action owing to the robot 100 being hugged by the user, the emotion managing unit 192 adds a predetermined value to the parameter indicating quality of mood. Conversely, when an unpleasant action is recognized by the actuality recognizing unit 154, the emotion managing unit 192 reduces the value of the parameter indicating quality of mood. For example, when the actuality recognizing unit 154 determines that a response by a user corresponds to an unpleasant action due to the robot 100 being subjected to violence by the user, the emotion managing unit 192 subtracts a predetermined value from the parameter indicating quality of mood.

The position converting unit 194 carries out a process of converting a virtual position into an actual position, and a process of converting an actual position into a virtual position, using a map stored in she map storage unit 168.

The position converting unit 194 may also convert a position using function processing, without using a map.

Fairy Introduction Implementation

Figure 13:
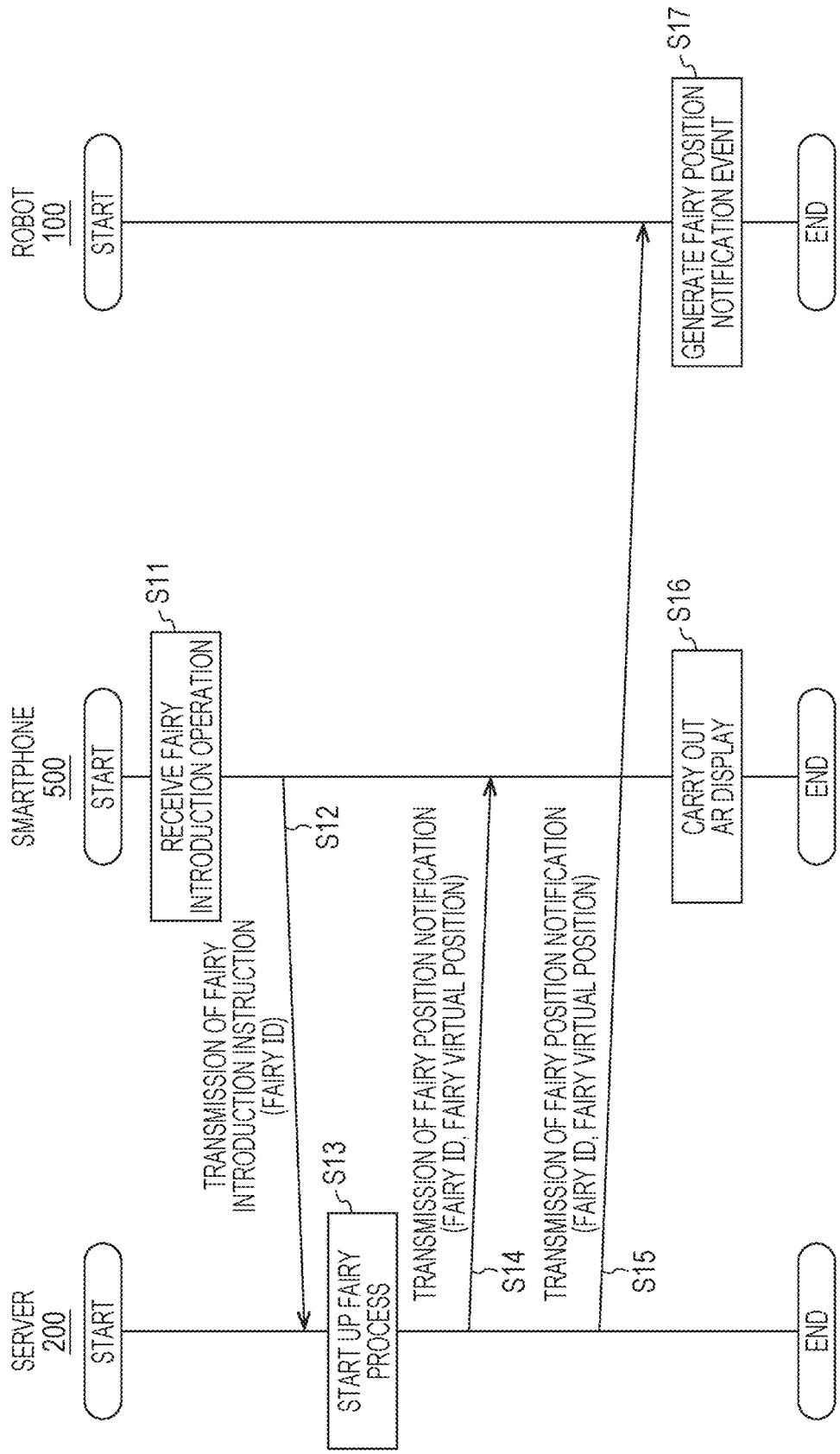
FIG. 13 is a sequence diagram showing a process of the fairy being introduced into the virtual space.

A process of the fairy being introduced into the virtual space will be described. FIG. 13 is a sequence diagram showing the process of the fairy being introduced into the virtual space.

In the situation shown in FIG. 6A, the operation receiving unit 522 of the smartphone 500 receives a fairy introducing operation by a user (S11). For example, the fairy the user wishes to introduce into the virtual space is specified by the user selecting a fairy name from a fairy list displayed on a screen of the smartphone 500.

The operation receiving unit 522 of the smartphone 500 transmits a fairy introduction instruction to the server 200 via the communication unit 506 (S12). Fairy ID identifying the subject of introduction is included in the fairy introduction instruction.

When the fairy introduction instruction is received in the communication unit 204 of the server 200, the virtual character introducing unit 250 of the server 200 initiates a fairy process (S13). Specifically, the virtual character introducing unit 250 reads a fairy program specified by the fairy ID from the virtual character program storage unit 260, causes the fairy program to be loaded into a memory, and causes the processor to execute an order code of the fairy program. As a result of this, a function (fairy control program) as the virtual character processing unit 256 is started in the data processing unit 202. Also, a virtual position of the fairy set in an initial process in the virtual character processing unit 256 is relayed to the virtual character position managing unit 252. The virtual position is specified using, for example, coordinates in the virtual space. Two or more fairies may be introduced. In this case, a multiple of fairy processes are initiated, and a multiple of virtual character processing units 256 are provided. The virtual character processing unit 256 continues control so that the fairy subsequently autonomously floats up in the virtual space.

The virtual character information providing unit 254 of the server 200 transmits a fairy position notification to the smartphone 500 via the communication unit 204 (S14), and transmits the same fairy position notification to the robot 100 (S15). The fairy ID and the virtual position of the fairy are included in the fairy position notification. When there are a multiple of robots 100 in the home, the virtual character information providing unit 254 transmits the fairy position notification to all the robots 100. However, when the fairy and one of the robots 100 are correlated, the virtual character information providing unit 254 may transmit the fairy position notification to only the correlated robot 100. By so doing, a situation wherein only a certain robot 100 can recognize the specified fairy can be set.

At this point, the fairy data 440, which correlate the fairy and the robot 100, will be discussed. FIG. 14 is a structural drawing showing one portion of the fairy data 440. The fairy data 440 are stored in the virtual character storage unit 262 of the server 200. When robot ID is correlated to fairy ID in the fairy data 440, information relating to the fairy is provided only to that robot 100. When no robot ID is correlated to the fairy ID, information relating to the fairy is provided to all the robots 100. Information relating to the fairy is, for example, a fairy position notification or a fairy operation notification. Parameters such as a name, a gender, physical characteristics, and behavioral characteristics of the fairy, and a graphic image, may be included in the fairy data 440.

Returning to the description of FIG. 13, when the fairy position notification is received in the communication unit 506 of the smartphone 500, the AR display processing unit 526 of the smartphone 500 carries out an AR display (S16). The AR display processing unit 526 converts the virtual position of the fairy into a fairy position in the actual space (an actual fairy position). Further, the AR display processing unit 526 displays a graphic image of the fairy superimposed on a background image filmed by the camera 510. When the actual position of the fairy is not included in a region of the actual space projected as the background image, the graphic image of the fairy is not displayed. That is, when the camera 510 is directed toward the actual position of the fairy, the graphic image of the fairy is displayed. When the camera 510 is not directed toward the position of the fairy, the graphic image of the fairy is not displayed.

An example of an application relating to a display of the fairy will be shown. The fairy may be displayed only when the actual position of the fairy is included in a limited range of a region of the actual space projected as the background image. The limited range may also be called a range within which a display can be carried out. For example, the limited range is set based on a position and a posture of the smartphone 500. A range including aspects that an angle formed with a main axis of the camera 510 is within a reference range, and that a distance from the camera 510 is equal to or greater than a lower limit value and equal to or less than an upper limit value, is conceivable as an example of a limited range. Because of this, a fairy that has moved to a corner of the display screen is not displayed. Also, a fairy that is too near or a fairy that is too far away is not displayed either. This completes the application example.

When the fairy position notification is received in the communication unit 142 of the robot 100, the virtual reality recognizing unit 182 of the robot 100 generates a notification event (S17). The generated notification event is added to the event table, as is the case with the event ID:2 of FIG. 11 shown as an example. In this way, a situation wherein the fairy is introduced in the virtual space is reached, as shown in FIG. 6B.

Fairy Movement Implementation

Figure 15:
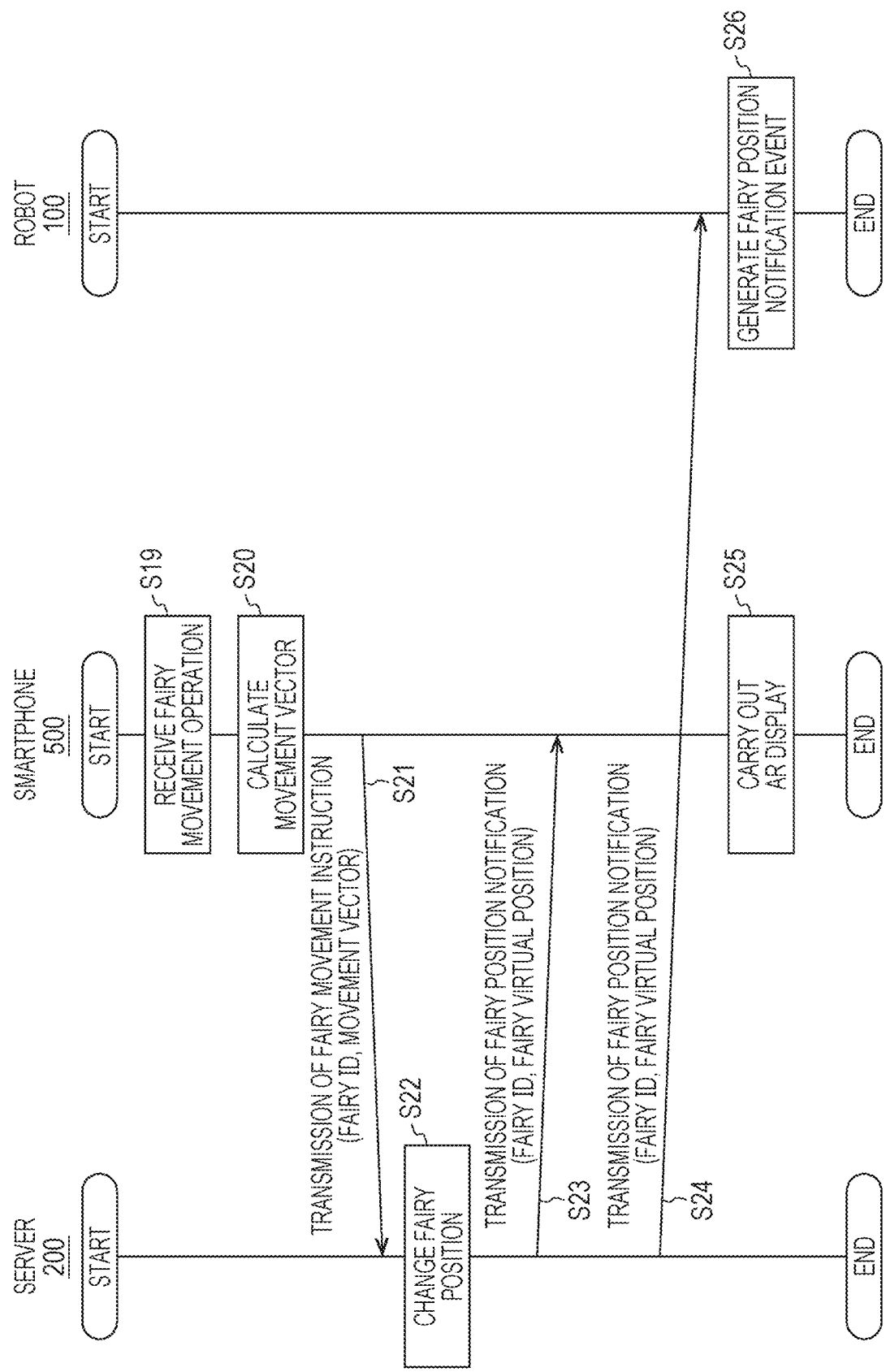
FIG. 15 is a sequence diagram showing a process of the fairy moving.

Continuing, a process of the fairy moving will be described. FIG. 15 is a sequence diagram showing the process of the fairy moving. In the example, the fairy position is changed by an instruction from an application 520 of the smartphone 500 being received.

In the situation shown in FIG. 6B, the operation receiving unit 522 of the smartphone 500 receives a fairy moving operation by a user (S19). For example, a sliding operation for causing the fairy to move is detected on the touch panel of the smartphone 500.

Then, the operation receiving unit 522 of the smartphone 500 calculates a movement vector in the virtual space based on, for example, the posture of the smartphone 500, a sliding direction, and a sliding amount (S20).

The operation receiving unit 522 of the smartphone 500 transmits a fairy movement instruction to the server 200 via the communication unit 506 (S21). Fairy ID specifying the subject of movement, and the movement vector in the virtual space, are included in the fairy movement instruction.

When the fairy movement instruction is received in the communication unit 204 of the server 200, the movement vector included in the fairy movement instruction is transferred to the virtual character position managing unit 252 together with the fairy ID. The virtual character position managing unit 252 changes the virtual position of the fairy specified in the fairy ID (S22). Specifically, a new virtual position is calculated by adding the movement vector to the current virtual position.

The virtual character information providing unit 254 of the server 200 transmits a fairy position notification to the smartphone 500 via the communication unit 204 (S23), and transmits the same fairy position notification to the robot 100 (S24). The fairy ID and the virtual position of the fairy are included in the fairy position notification. When there are a multiple of robots 100 in the home, the virtual character information providing unit 254 transmits the fairy position notification to ail the robots 100, as heretofore described. However, when the fairy and one of the robots 100 are correlated, the virtual character information providing unit 254 transmits the fairy position notification to only the correlated robot 100.

When the fairy position notification is received in the communication unit 506 of the smartphone 500, the AR display processing unit 526 of the smartphone 500 carries out an AR display based on the virtual position of the fairy (S25).

When the fairy position notification is received in the communication unit 142 of the robot 100, the virtual reality recognizing unit 182 of the robot 100 generates a fairy position notification event (S26). The generated fairy position notification event is added to the event table. In this way, a situation wherein the fairy has moved in the virtual space is reached, as shown in FIG. 6C.

Although the smartphone 500 calculates the movement vector in the heretofore described example, the movement vector may also be calculated by the server 200. For example, the virtual character processing unit 256 constantly causes the fairy to move little by little in order that the fairy floats up in the virtual space. To this end, the virtual character processing unit 256 repeatedly carries out a process of calculating an irregular movement vector using, for example, random numbers, and changing the fairy position in accordance with the movement vector. Further, in the same way as in the case of FIG. 15, the server 200 transmits a fairy position notification every time the fairy position is changed, an AR display is carried out in the smartphone 500, and a fairy position notification event is generated in the robot 100.

Figure 16:
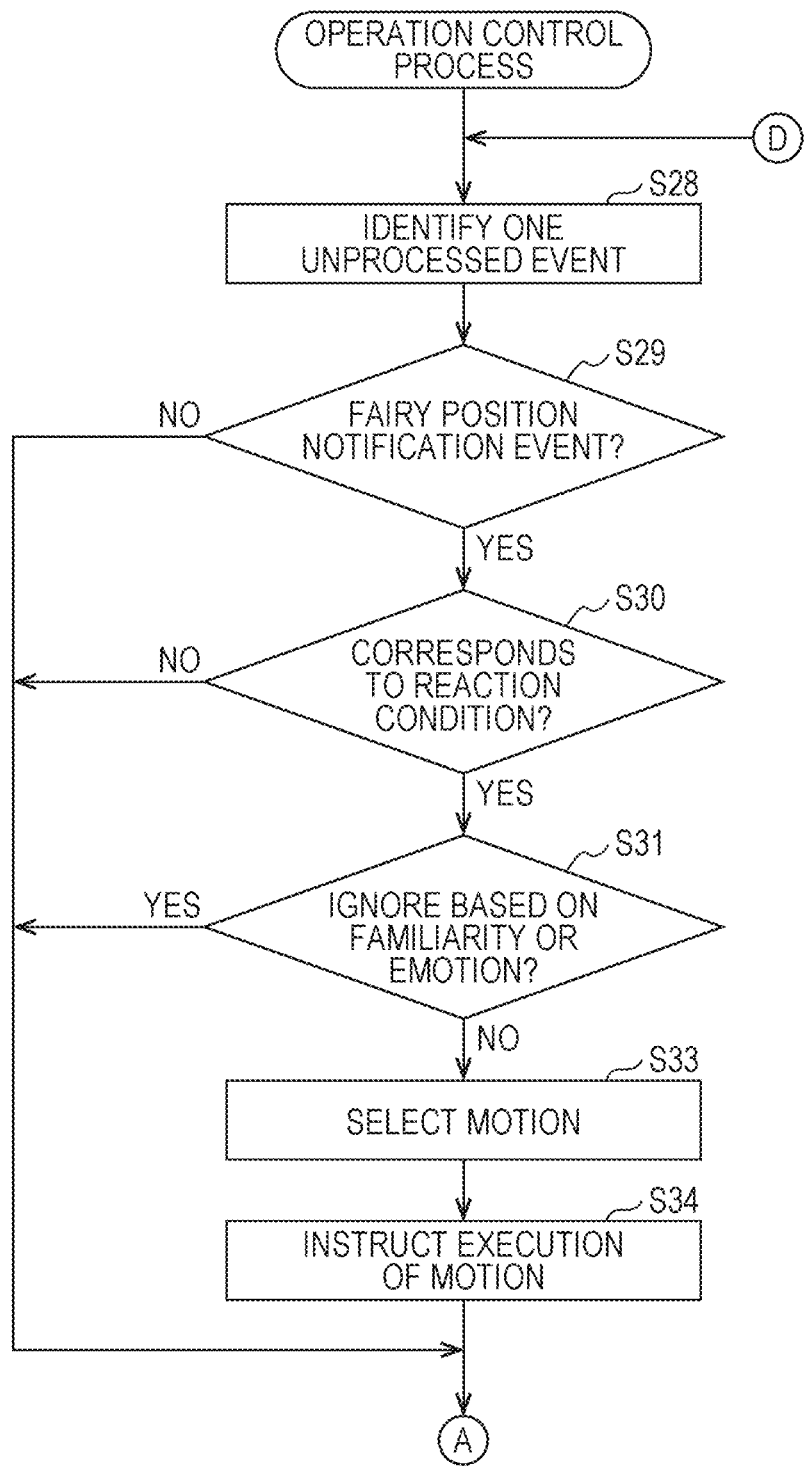
FIG. 16 is a flowchart showing an operation control process.

At this point, a shift will be made to a description of a process in the robot 100. When an event is generated in the robot 100, the robot 100 operates in accordance with the event. A flowchart in FIG. 16 shows an operation control process in the robot 100.

The operation control unit 150 of the robot 100 constantly monitors the event table, and identifies unprocessed events one by one (S28). When there are a multiple of unprocessed events, the first occurring event is identified. When there is no unprocessed event, the operation control unit 150 stands by until a new event occurs.

The operation control unit 150 of the robot 100 determines whether or not an identified unprocessed event is a fairy position notification event (S29).

Figure 18:
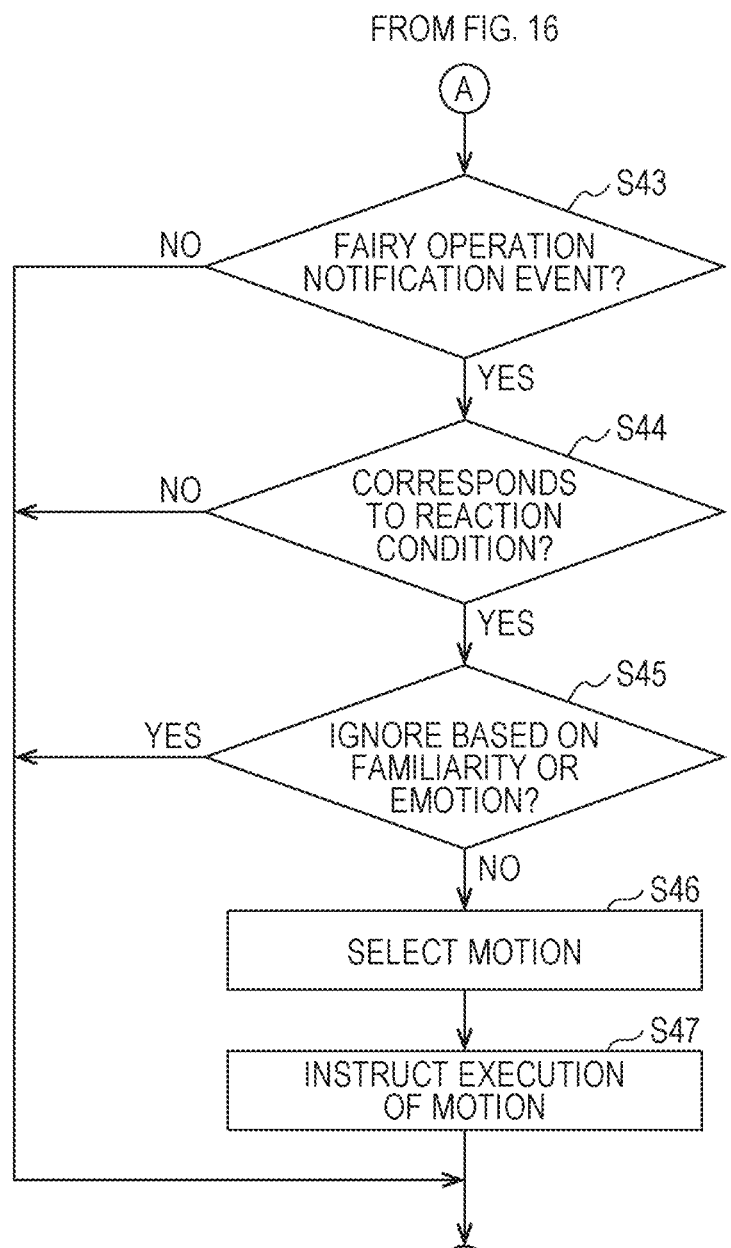
FIG. 18 is a flowchart showing a continuation of the operation control process of FIG. 16.

When the identified unprocessed event is not a fairy position notification event, a shift is made via a terminal A to a process of S43 shown in FIG. 18.

Meanwhile, when the identified unprocessed event is a fairy position notification event, the operation control unit 150 of the robot 100 determines whether or not the fairy position notification event corresponds to a reaction condition (S30). A reaction condition is a condition specifying an event that forms a trigger for a motion, and is set in advance in the motion selection table. For example, in the case of a specification wherein the robot 100 attempts to approach the fairy when the fairy is distanced from the robot 100, a distance between the actual position into which the fairy position notified of is to be projected and the robot 100 being less than a predetermined value is the reaction condition. The actual position into which the fairy position is to be projected is obtained by the position converting unit 194 of the robot 100 carrying out a positional conversion from the virtual space to the actual space.

When the operation control unit 150 determines that the fairy position notification event does not correspond to a reaction condition, a shift is made via the terminal A to the process of S43 shown in FIG. 18.

Meanwhile, when the operation control unit 150 determines that the fairy position notification event corresponds to a reaction condition, the operation control unit 150 of the robot 100 determines whether or not to ignore the fairy position notification event (S31). For example, the operation control unit 150 of the robot 100 decides based on familiarity corresponding to the fairy ID and the various emotion parameters indicating an emotion (loneliness, curiosity, a desire for approval, quality of mood, and the like) of the robot 100. For example, the operation control unit 150 of the robot 100 does not ignore the fairy position notification event when the familiarity corresponding to the fairy ID is equal to or greater than a reference value, and in the same way, ignores the fairy position notification event when the familiarity drops below the reference value. Alternatively, the operation control unit 150 of the robot 100 does not ignore the fairy position notification event when the emotion parameter indicating loneliness is equal to or lower than a reference value, but may ignore the fairy position notification event when the reference value is exceeded. Also, the operation control unit 150 of the robot 100 does not ignore the fairy position notification event when the emotion parameter indicating quality of mood is equal to or greater than a reference value, but may ignore the fairy position notification event when the emotion parameter indicating quality of mood is below the reference value. Furthermore, a decision based on familiarity and a decision based on an emotion parameter may be combined. In this way, a performance effect is achieved in that actions of the robot 100 differ in accordance with the psychological state of the robot 100 at the time.

When the operation control unit 150 determines that the fairy position notification event is to be ignored, a shift is made via the terminal A to the process of S43 shown in FIG. 18.

Meanwhile, when the operation control unit 150 determines that the fairy position notification event is not to be ignored, the operation control unit 150 of the robot 100 selects a motion in accordance with the fairy position notification event based on the motion selection table (S33). At this time, the operation control unit 150 may select a motion in accordance with familiarity with respect to the fairy. For example, a multiple of motions are correlated to one reaction condition, and the operation control unit 150 may select one of the motions based on the familiarity with respect to the fairy. When a fairy position notification event indicating a fairy position considerably distanced from the robot 100 occurs, the robot 100 advancing quickly toward the fairy when the familiarity with respect to the fairy is equal to or greater than the reference value, and the robot 100 advancing slowly toward the fairy when the familiarity with respect to the fairy is below the reference value, is conceivable as an example.

Also, a multiple of motions are correlated to one reaction condition, and the operation control unit 150 may select one of the motions based on an emotion of the robot 100. When a fairy position notification event indicating that the robot 100 is considerably distanced from the fairy occurs, the operation control unit 150 of the robot 100 selecting a motion of advancing quickly toward the fairy when the emotion parameter indicating loneliness exceeds the reference value, and selecting a motion of advancing slowly toward the fairy when the emotion parameter indicating loneliness is equal to or lower than the reference value, is conceivable as an example. Also, the operation control unit 150 of the robot 100 may select a motion of advancing quickly toward the fairy when the emotion parameter indicating quality of mood exceeds the reference value, and select a motion of advancing slowly toward the fairy when the emotion parameter indicating quality of mood is equal to or lower than the reference value. Furthermore, a decision based on familiarity and a decision based on an emotion parameter may be combined. In this way, a performance effect is achieved in that actions of the robot 100 differ in accordance with the psychological state of the robot 100 at the time.

The operation control unit 150 of the robot 100 instructs the drive mechanism 120 to execute the selected motion (S34). Then, a shift is made via the terminal A to the process of S43 shown in FIG. 18.

Fairy Operation Implementation

Continuing, a description will be given of a process of the fairy carrying out a dance-like operation. Although the virtual character processing unit 256 may autonomously cause an operation of the fairy to start, an aspect wherein the fairy starts an operation in accordance with an instruction from the smartphone 500 will be described here.

Figure 17:
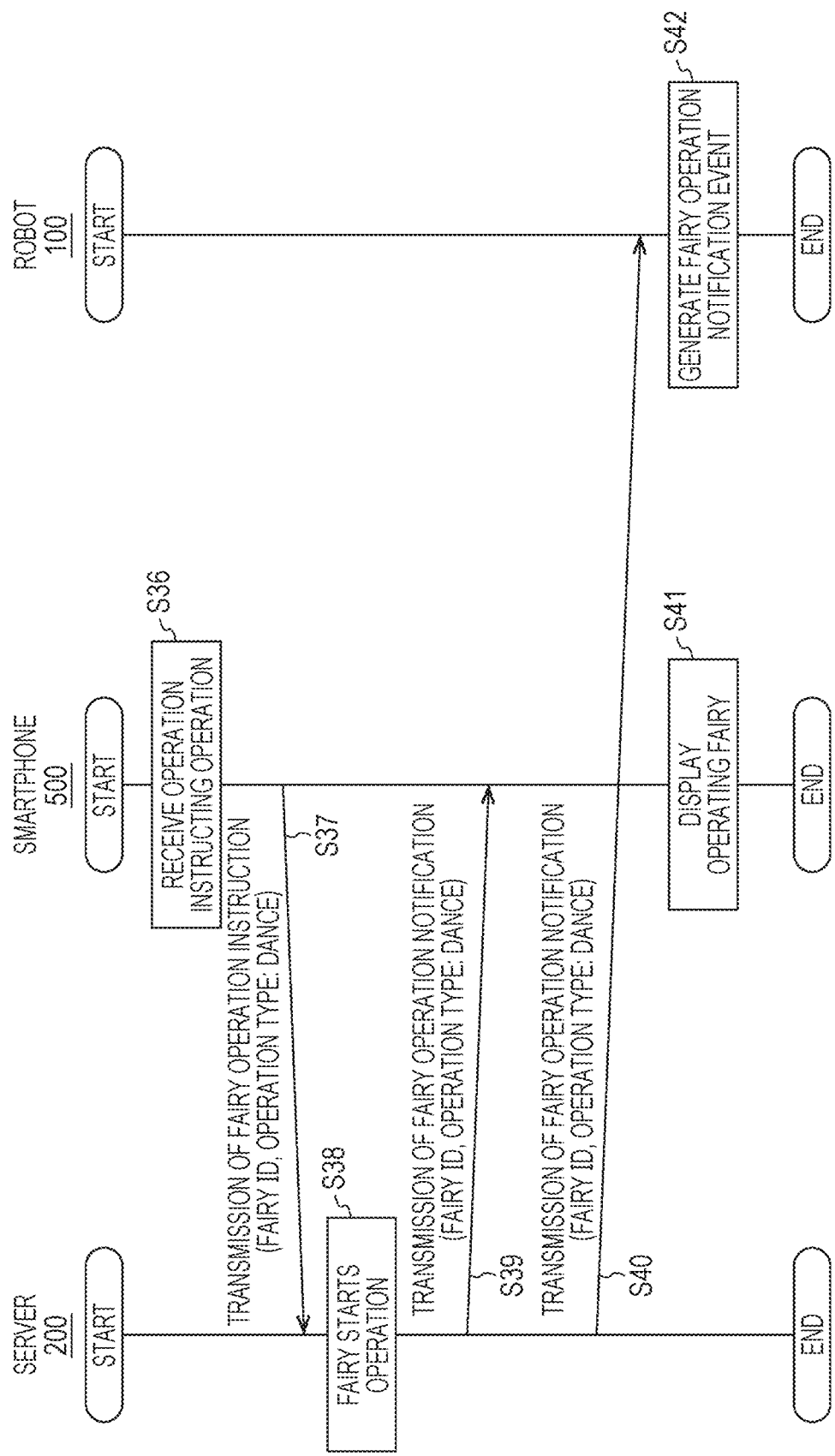
FIG. 17 is a sequence diagram showing a process of the fairy dancing.

FIG. 17 is a sequence diagram showing a process of the fairy dancing. In the situation shown in FIG. 7A, the operation receiving unit 522 of the smartphone 500 receives an operation instructing operation from a user (S36). For example, the user selects an operation type from an operation list displayed on the screen of the smartphone 500. In the example, it is assumed that a dance is selected as the operation type. Rather than simply a dance, a specific dance type (for example, a hula dance) may be selected. In this case, the dance type is specified as the operation type.

The operation receiving unit 522 of the smartphone 500 transmits a fairy operation notification to the server 200 via the communication unit 506 (S37). Fairy ID specifying the subject of the operation, and the operation type, are included in the fairy operation instruction.

When the fairy operation instruction is received in the communication unit 204 of the server 200, the virtual character processing unit 256 specified in the fairy ID causes an operation of the fairy to start (S38). Specifically, the virtual character processing unit 256 holds the operation type as a state parameter.

The virtual character information providing unit 254 of the server 200 transmits a fairy operation notification to the smartphone 500 via the communication unit 204 (S39), and transmits the same fairy operation notification to the robot 100 (S40). The fairy ID and the operation type are included in the fairy operation notification. When there are a multiple of robots 100 in the home, the virtual character information providing unit 254 transmits the fairy operation notification to all the robots 100, as heretofore described. However, when the fairy and one of the robots 100 are correlated, the virtual character information providing unit 254 transmits the fairy operation notification to only the correlated robot 100.

When the fairy operation notification is received in the communication unit 506 of the smartphone 500, the AR display processing unit 526 of the smartphone 500 displays the operating fairy on an AR screen (S41). In the example, a dancing fairy is displayed.

When the fairy operation notification is received in the communication unit 142 of the robot 100, the virtual reality recognizing unit 182 of the robot 100 generates a fairy operation notification event (S42). The generated fairy operation notification event is added to the event table. In this way, a situation wherein the fairy is dancing in the virtual space is reached, as shown in FIG. 7B.

The application 520 may be an application that only issues an instruction for an introduction of the fairy, without causing the fairy to move or causing the fairy to operate.

A shift will be made to a description of a process in the robot 100 when a fairy operation notification event occurs. FIG. 18 shows an operation control process flow continuing from FIG. 16.

The operation control unit 150 of the robot 100 determines whether or not the unprocessed event identified in S28 of FIG. 16 is a fairy operation notification event (S43).

Figure 20:
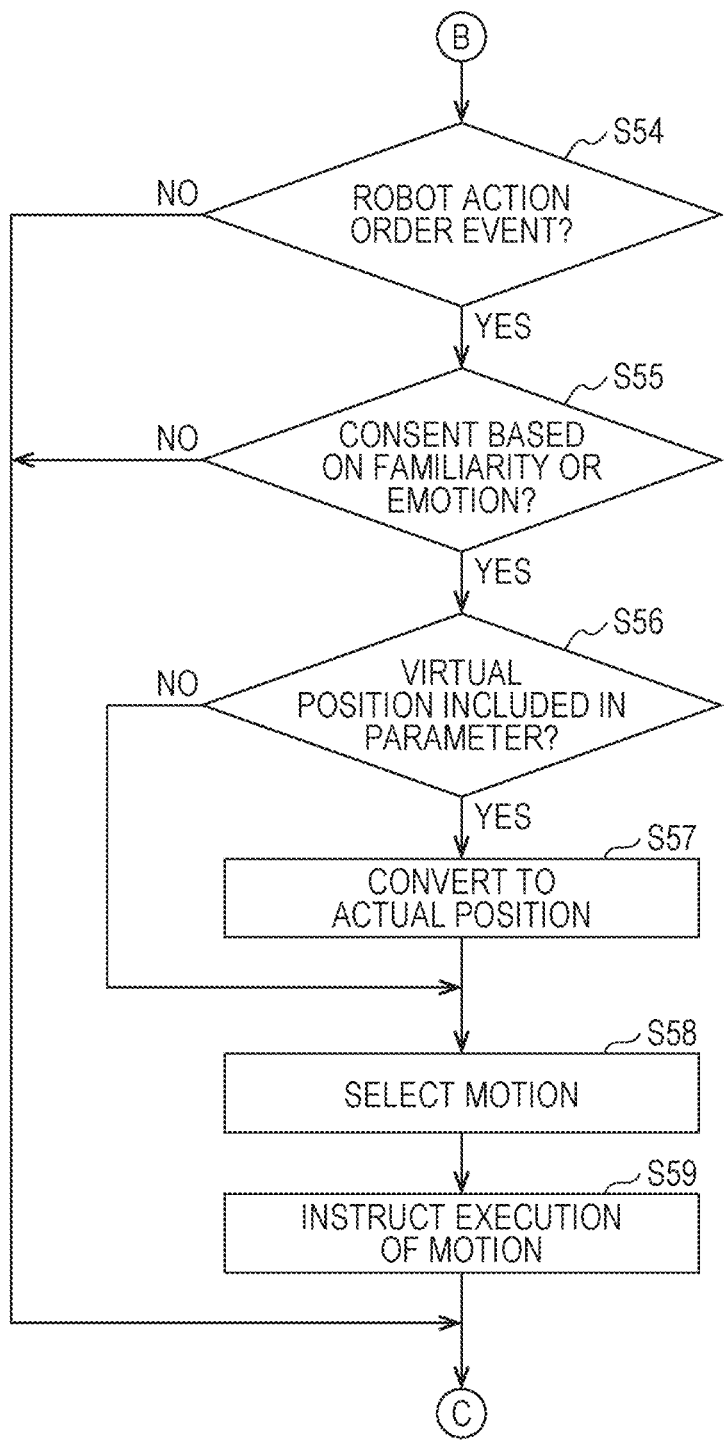
FIG. 20 is a flowchart showing a continuation of the operation control process of FIG. 18.

When the unprocessed event is not a fairy operation notification event, a shift is made via a terminal B to a process of S54 shown in FIG. 20.

Meanwhile, when the unprocessed event is a fairy operation notification event, the operation control unit 150 of the robot 100 determines whether or not the fairy operation notification event corresponds to a reaction condition (S44). As heretofore described, a reaction condition is a condition specifying an event that forms a trigger for a motion, and is set in advance in the motion selection table. For example, in the case of a specification wherein the robot 100 also dances when the fairy is dancing, the operation type included in the fairy operation notification being "dance" is the reaction condition.

When the operation control unit 150 determines that the fairy operation notification event does not correspond to a reaction condition, a shift is made via the terminal B to the process of S54 shown in FIG. 20.

Meanwhile, when the operation control unit 150 determines that the fairy operation notification event corresponds to a reaction condition, the operation control unit 150 of the robot 100, in the same way as in the case of the process shown in S31 of FIG. 16, determines whether or not to ignore the fairy operation notification event (S45).

When the operation control unit 150 determines that the fairy operation notification event is to be ignored, a shift is made via the terminal B to the process of S54 shown in FIG. 20.

Meanwhile, when the operation control unit 150 determines that the fairy operation notification event is not to be ignored, the operation control unit 150 of the robot 100 selects a motion in accordance with the fairy operation notification event based on the motion selection table (S46). The operation control unit 150 may select a motion in accordance with familiarity with respect to the fairy. For example, it is conceivable that a multiple of motions are correlated to one reaction condition in the motion selection table, and when a fairy operation notification event indicating that the fairy is dancing occurs, the operation control unit 150 selects a motion of dancing energetically when the familiarity with respect to the fairy is equal to or greater than the reference value, and selects a motion of dancing gently when the familiarity with respect to the fairy is below the reference value.

Also, a multiple of motions are correlated to one reaction condition, and the operation control unit 150 may select one of the motions based on an emotion of the robot 100. When a fairy operation notification event indicating that the fairy is dancing occurs, the operation control unit 150 of the robot 100 selecting a motion of dancing gently when the emotion parameter indicating loneliness exceeds the reference value, and selecting a motion of dancing energetically when the emotion parameter indicating loneliness is equal to or lower than the reference value, is conceivable as an example. Also, the operation control unit 150 of the robot 100 may select a motion of dancing energetically when the emotion parameter indicating quality of mood exceeds the reference value, and select a motion of dancing gently when the emotion parameter indicating quality of mood is equal to or lower than the reference value. Furthermore, a decision based on familiarity and a decision based on an emotion parameter may be combined. In this way, a performance effect is achieved in that actions of the robot 100 differ in accordance with the psychological state of the robot 100 at the time.

The operation control unit 150 of the robot 100 instructs the drive mechanism 120 to execute the selected motion (S47). Then, a shift is made via the terminal B to the process of S54 shown in FIG. 20.

Order Forwarding Implementation

Figure 19:
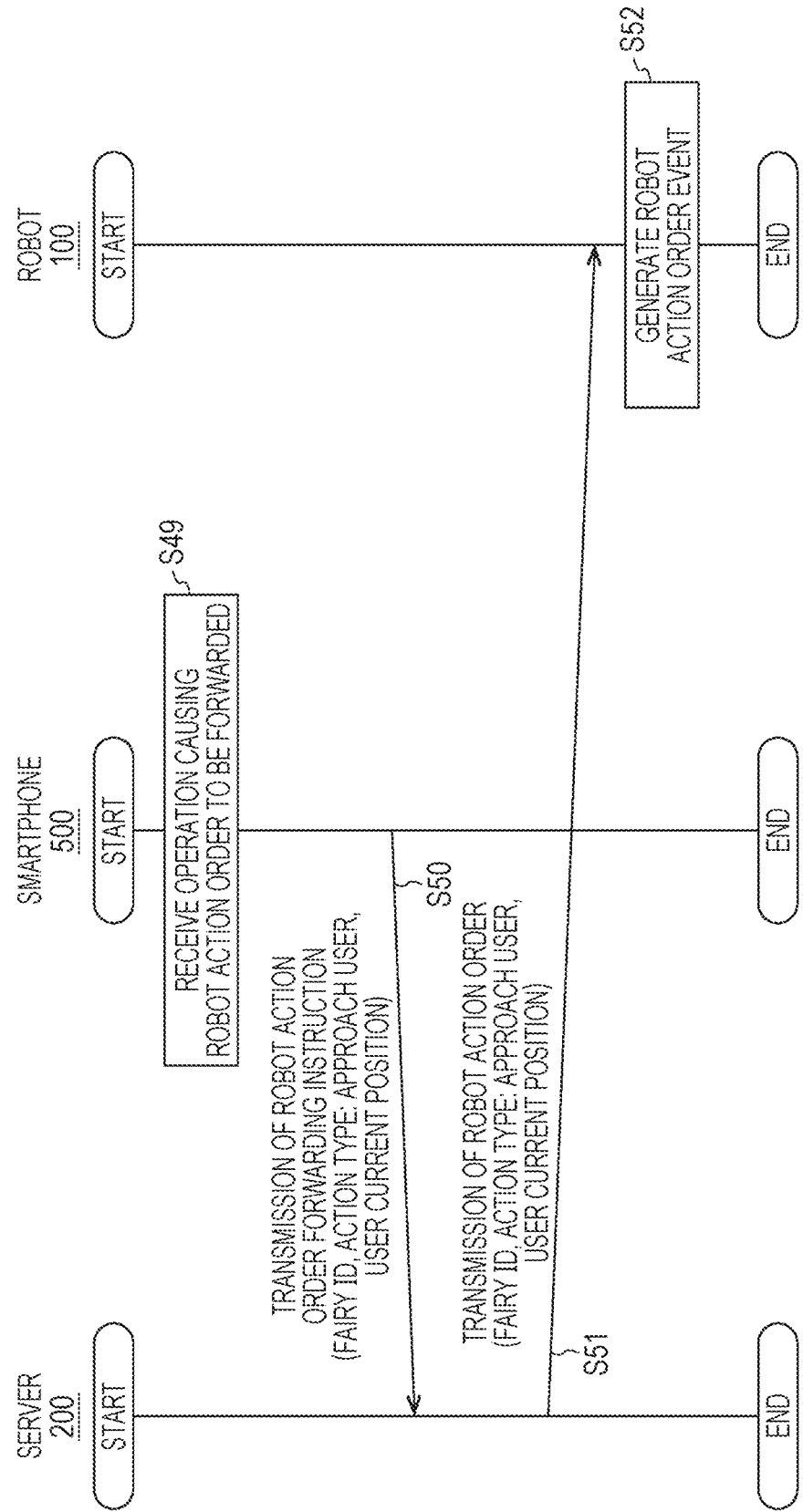
FIG. 19 is a sequence diagram showing a process of a robot action order being forwarded.

Next, a process of the fairy forwarding an action order to the robot 100 will be described. FIG. 19 is a sequence diagram showing the process of a robot action order being forwarded.

When a user attempts to cause the robot 100 to carry out some action, the user orders the robot 100 via the fairy rather than ordering the robot 100 directly, as illustrated in FIG. 1. To this end, the operation receiving unit 522 of the smartphone 500 receives an instructional operation for causing a robot action order to be forwarded to the fairy (S49). For example, the user issues an instruction causing a robot action order to be forwarded to the fairy by selecting the type of action the user wishes the robot 100 to carry out from an action order list displayed on the screen of the smartphone 500. The action type in the example is "approach a user", "approach the fairy", "dance", "sing", or the like.

The operation receiving unit 522 of the smartphone 500 transmits the robot action order forwarding instruction to the server 200 via the communication unit 506 (S50). Fairy ID, the action type, and the parameter to be forwarded in the robot action order are included in the robot action order forwarding instruction. When the action type is an approach to a user, the parameter is the actual position of the user. Details of the parameter depend on the action type.

When the robot action order forwarding instruction is received in the communication unit 204 of the server 200, the virtual character processing unit 256 specified in the fairy ID forwards the robot action order via the communication unit 204 (S51). The heretofore described fairy ID, action type, and parameter are included in the robot action order. The virtual character processing unit 256 may decide whether to allow or refuse the forwarding of the order before the process of S51. For example, the virtual character processing unit 256 may refuse the forwarding of the order when little time has passed since the timing of carrying out a previous order forwarding.

When the robot action order is received in the communication unit 142 of the robot 100, the virtual reality recognizing unit 182 of the robot 100 generates a robot action order event (S52). The generated robot action order event is added to the event table.

A shift will be made to a description of a process in the robot 100 when a robot action order event occurs. FIG. 20 shows an operation control process flow continuing from FIG. 18.

The operation control unit 150 of the robot 100 determines whether or not the unprocessed event identified in S28 of FIG. 16 is a robot action order event (S54).

Figure 21:
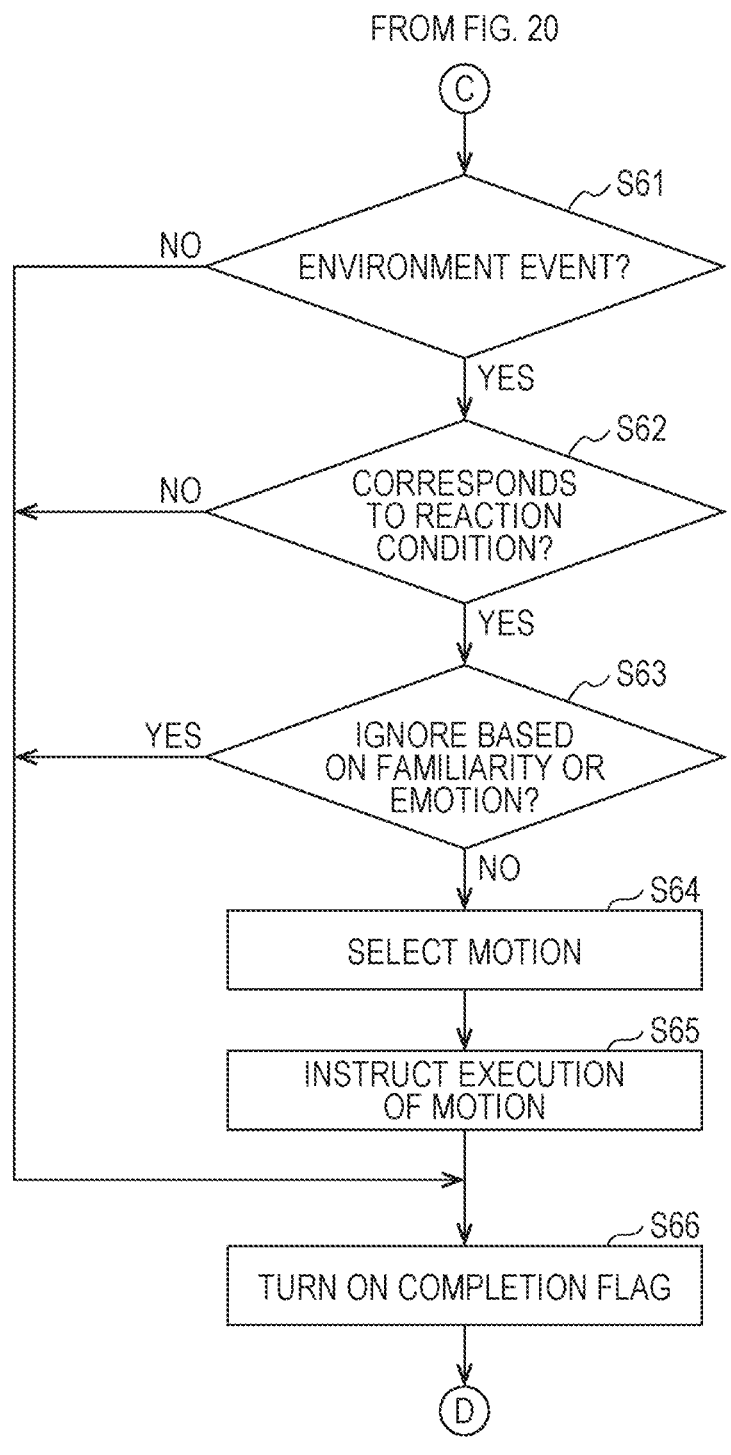
FIG. 21 is a flowchart showing a continuation of the operation control process of FIG. 20.

When the unprocessed event is not a robot action order event, a shift is made via a terminal C to a process of S61 shown in FIG. 21.

Meanwhile, when the unprocessed event is a robot action order event, the operation control unit 150 of the robot 100 determines whether or not to consent to the robot action order (S55). Consenting means allowing the order, and not consenting means refusing the order.

For example, the operation control unit 150 of the robot 100 decides based on familiarity corresponding to the fairy ID and the various emotion parameters indicating an emotion (loneliness, curiosity, a desire for approval, quality of mood, and the like) of the robot 100. For example, the operation control unit 150 of the robot 100 consents when the familiarity corresponding to the fairy ID is equal to or greater than a reference value, and does not consent when the familiarity drops below the reference value. Alternatively, the operation control unit 150 of the robot 100 may consent when the emotion parameter indicating loneliness is equal to or lower than the reference value, but not consent when the reference value is exceeded. Also, the operation control unit 150 of the robot 100 may consent when the emotion parameter indicating quality of mood is equal to or greater than the reference value, but not consent when the emotion parameter indicating quality of mood is below the reference value. Furthermore, a decision based on familiarity and a decision based on an emotion parameter may be combined. In this way, a performance effect is achieved in that actions of the robot 100 differ in accordance with the psychological state of the robot 100 at the time.

When the robot 100 does not consent to the robot action order, a message to the effect that the robot 100 does not consent to the robot action order may be returned to the virtual character processing unit 256 of the server 200. In this case, the virtual character processing unit 256 may forward the message from the robot 100 to the application 520 of the smartphone 500. Further, the application 520 of the smartphone 500 may output the message from the robot 100.

When the robot 100 consents to the robot action order, the operation control unit 150 of the robot 100 determines whether or not the virtual position is included in the parameter of the robot action order event (S56). When the virtual position is not included in the parameter of the robot action order event, a shift is made directly to a process of S58. Meanwhile, when the virtual position is included in the parameter of the robot action order event, the position converting unit 194 of the robot 100 converts the virtual position into an actual position (S57). For example, in a robot action order event of "approach the fairy", the virtual position of the fairy is converted into an actual position of the fairy.

The operation control unit 150 of the robot 100 selects a motion in accordance with the robot action order event based on the motion selection table (S58). At this time, the operation control unit 150 may select a motion in accordance with familiarity with respect to the fairy. For example, a multiple of motions are correlated to one robot action order event in the motion selection table, and the operation control unit 150 may select one of the motions based on the familiarity with respect to the fairy. When a robot action order event ordering an approach to a user occurs, selecting a motion of moving quickly toward the user when the familiarity with respect to the fairy is equal to or greater than the reference value, and selecting a motion of moving slowly toward the user when the familiarity with respect to the fairy is below the reference value, is conceivable as an example.

Also, a multiple of motions are correlated to one robot action order event, and the operation control unit 150 may select one of the motions based on an emotion of the robot 100. When a robot action order event ordering an approach to a user occurs, the operation control unit 150 of the robot 100 selecting a motion of moving quickly toward the user when the emotion parameter indicating loneliness exceeds the reference value, and selecting a motion of moving slowly toward the user when the emotion parameter indicating loneliness is equal to or lower than the reference value, is conceivable as an example. Also, the operation control unit 150 of the robot 100 may select a motion of moving quickly toward the user when the emotion parameter indicating quality of mood exceeds the reference value, and select a motion of moving slowly toward the user when the emotion parameter indicating quality of mood is equal to or lower than the reference value. Furthermore, a decision based on familiarity and a decision based on an emotion parameter may be combined. In this way, a performance effect is achieved in that actions of the robot 100 differ in accordance with the psychological state of the robot 100 at the time.

The operation control unit 150 of the robot 100 instructs the drive mechanism 120 to execute the selected motion (S59). For example, when the action type is an approach to a user, the drive mechanism 120 carries out a motion for moving toward the actual position of the user. When the action type is a dance, the drive mechanism 120 carries out a motion wherein slight rotations and movements are combined. Then, a shift is made via the terminal C to the process of S61 shown in FIG. 21.

Process Resulting from Environment Event

Continuing, a description will be given of a process when an environment event occurs. FIG. 21 is a flowchart showing a continuation of the operation control process of FIG. 20.

The operation control unit 150 of the robot 100 determines whether or not the unprocessed event identified in S28 of FIG. 16 is an environment event (S61).

When the operation control unit 150 determines that the unprocessed event is not an environment event, a shift is made to a process of S66. Meanwhile, when the operation control unit 150 determines that the unprocessed event is an environment event, the operation control unit 150 of the robot 100 determines whether or not the environment event corresponds to a reaction condition (S62). As heretofore described, a reaction condition is a condition specifying an event that forms a trigger for a motion, and is set in advance in the motion selection table. For example, in the case of a specification wherein the robot 100 says "turn on the cooler" when the air temperature is high, the environment event type being "it's extremely hot" is the reaction condition.

When the operation control unit 150 determines that the environment event does not correspond to a reaction condition, a shift is made to the process of S66. Meanwhile, when the operation control unit 150 determines that the environment event corresponds to a reaction condition, the operation control unit 150 of the robot 100, in the same way as in the case of the process of S31 shown in FIG. 16, determines whether or not to ignore the environment event (S63).

When the operation control unit 150 determines that the environment event is to be ignored, a shift is made to the process of S66. Meanwhile, when the operation control unit 150 determines that the environment event is not to be ignored, the operation control unit 150 of the robot 100 selects a motion in accordance with the environment event based on the motion selection table (S64).

The operation control unit 150 of the robot 100 instructs the drive mechanism 120 to execute the motion (S65). At a stage at which the execution of the motion is finished, the operation control unit 150 of the robot 100 may send a message stating that the execution is completed to the virtual character processing unit 256 of the server 200. In this case, the virtual character processing unit 256 may forward the message stating that the execution is completed to the smartphone 500. Further, the application 520 of the smartphone 500 may output the message stating that the execution is completed.

Furthermore, a configuration may be such that when the smartphone 500 outputs the message stating that the execution is completed, a message of appreciation saying "thank you" is received from the user in the application 520. Further, the application 520 may transmit the message of appreciation to the virtual character processing unit 256 of the server 200. On receiving this, the virtual character processing unit 256 of the server 200 may forward the message of appreciation to the robot 100.

When the communication data input unit 188 of the robot 100 acquires the message of appreciation, the virtual reality recognizing unit 182 may recognize that the message of appreciation is a pleasant action by the user. Further, when a pleasant action is detected in the virtual reality recognizing unit 182 in this way, the familiarity managing unit 190 may increase the familiarity with respect to the user. Furthermore, the familiarity managing unit 190 may increase the familiarity with respect to the fairy in the virtual space at the time. In addition, the emotion managing unit 192 may, for example, increase the emotion parameter indicating quality of mood.

Returning to the description of FIG. 21, on instructing the execution of the motion, the operation control unit 150 turns on the completion flag of the event identified in S28 of FIG. 16 (S66). Then, returning to S28 of FIG. 16, the operation control unit 150 identifies the next event.

Visual Fairy Recognition Application

Continuing, a description will be given of an example of an application of visual recognition of the fairy by a user as a trigger of a predetermined process. Herein, an example wherein the robot system 300 operates so that a movement of data is carried out when a user visually recognizes the fairy by holding up the smartphone 500 will be shown.

A case wherein the robot 100 attempts to post photographic data to an SNS server will be envisaged. When a user checks the fairy on an AR display on the smartphone 500 in this kind of situation, the fairy is projected carrying data, and a data transmission is started. That is, the data transmission is visualized by configuring so that the user visually recognizing the fairy carrying data forms a trigger event for the data transmission. By so doing, concern that data might be transmitted without the user knowing is removed, and the user can be provided with a sense of security.

Hereafter, three examples relating to data movement will be described. In each example, the robot system 300 stands by without causing data to be moved when a user is not visually recognizing the fairy, and moves the data after the user visually recognizes the fairy. In this example, it is assumed that the user is visually recognizing the fairy provided that the fairy is appearing in an AR display. Alternatively, it may be decided that the user is visually recognizing the fairy when the face of the user appears in an image filmed by the camera 510 on the display screen side of the smartphone 500 simultaneously with the fairy appearing in an AR display.

Figure 22:
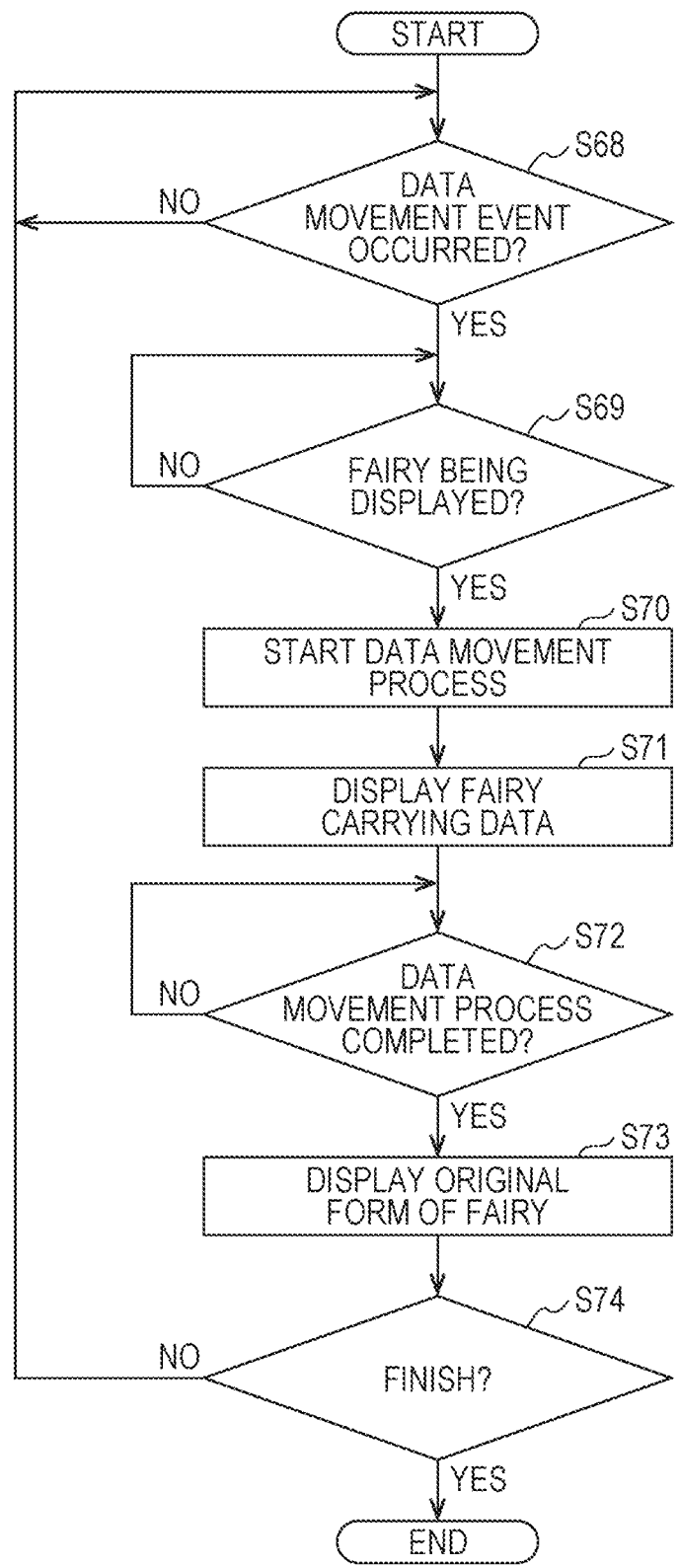
FIG. 22 is a flowchart relating to a data movement process n the smartphone.

Firstly, an example wherein a data movement process is carried out in the smartphone 500 will be described. FIG. 22 is a flowchart relating to the data movement process in the smartphone 500.

The data moving unit 528 of the smartphone 500 determines whether or not a data movement event has occurred (S68). For example, a data movement event occurs at a timing at which a photograph of the robot 100 filmed by the camera 510 of the smartphone 500 is automatically posted to an SNS server. In the case of this example, movement target data stored in the movement target data storage unit 530 are photographic data filmed by the camera 510 of the smartphone 500.

When the data moving unit 528 determines that no data movement event has occurred, the data moving unit 528 repeats the process of S68. Meanwhile, when the data moving unit 528 determines that a data movement event has occurred, the AR display processing unit 526 of the smartphone 500 determines whether or not the fairy is being displayed within the AR screen (S69).

When the AR display processing unit 526 determines that the fairy is not being displayed within the AR screen, the AR display processing unit 526 repeats the process of S69. Consequently, a standby is continued unless the fairy is displayed. Meanwhile, when the AR display processing unit 526 determines that the fairy is being displayed within the AR screen, the data moving unit 528 of the smartphone 500 starts the data movement process (S70), and the AR display processing unit 526 of the smartphone 500 causes a graphic image representing the fairy carrying data to be displayed on the AR screen (S71). By the displayed fairy being changed to one representing data being carried, the user can recognize that data forwarding is being carried out.

Subsequently, the data moving unit 528 of the smartphone 500 determines whether or not the data movement process is completed (S72). When the data movement process is not completed, the data moving unit 528 repeats the process of S72, and waits for the completion of the data movement process. When the data movement process is completed, the AR display processing unit 526 of the smartphone 500 displays the original form of the fairy (S73). That is, a graphic image of the fairy when doing nothing is displayed. By returning to a graphic image representing the original form, the user can recognize that the data forwarding is finished.

For example, the routine shown in FIG. 22 finishes when an SNS automatic posting program is stopped (a YES route of S74). Meanwhile, when the automatic posting program is not stopped, a return is made to the process of S68 in readiness for the next posting operation, and the heretofore described process is repeated (a NO route of S74).

Figure 23:
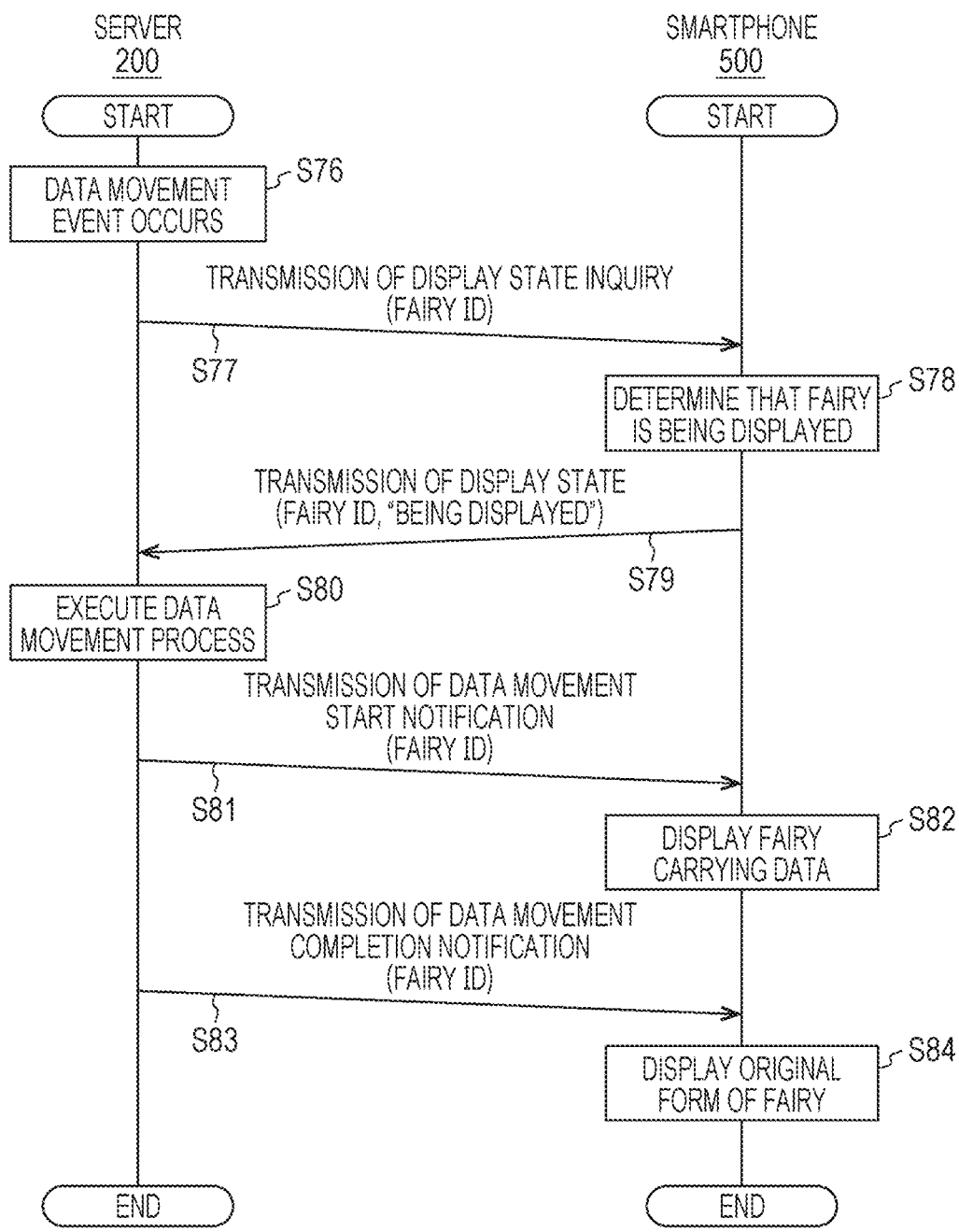
FIG. 23 is a sequence diagram relating to a data movement process in the server.

Secondly, an example wherein a data movement process is carried out in the server 200 will be described. FIG. 23 is a sequence diagram relating to the data movement process in the server 200.

The data moving unit 246 of the server 200 determines whether or not a data movement event has occurred. For example, a data movement event occurs at a timing at which photographic data are automatically posted from the server 200 to an SNS server. As a precondition, it is assumed that photographic data filmed by the camera of the robot 100 are forwarded to the server 200, and stored in the data storage unit 206 of the server 200.

When the data moving unit 246 determines that a data movement event has occurred (S76), the data moving unit 246 of the server 200 transmits an inquiry relating to the display state of the fairy to the smartphone 500 (S77). Fairy ID identifying the fairy for which the success or failure of the display is inquired about is added to the inquiry.

When the inquiry relating to the display state of the fairy is received in the communication unit 506 of the smartphone 500, the AR display processing unit 526 of the smartphone 500 determines whether or not the fairy is being displayed within the AR screen. When it is determined by the AR display processing unit 526 of the smartphone 500 that the fairy is not being displayed, a display state indicating that the fairy is "not displayed" is transmitted from the communication unit 506 of the smartphone 500 to the server 200.

When the display state "not displayed" is received in the communication unit 204 of the server 200, the transmission of the inquiry relating to the display state of the fairy is repeated by the data moving unit 246 of the server 200. The smartphone 500 also repeats the heretofore described process. Consequently, a standby is continued unless the fairy is displayed.

Meanwhile, when it is determined by the AR display processing unit 526 of the smartphone 500 that the fairy is being displayed (S78), a display state indicating that the fairy is "being displayed" is transmitted to the server 200 (S79).

When the display state indicating that the fairy is "being displayed" is received in the communication unit 204 of the server 200, the data moving unit 246 of the server 200 executes a data movement process (S80). For example, an article is posted to an SNS. Further, the data moving unit 246 of the server 200 transmits notification of the start of data movement to the smartphone 500 (S81). The fairy ID is included in the notification of the start of data movement.

When the notification of the start of data movement, is received in the communication unit 506 of the smartphone 500, the AR display processing unit 526 of the smartphone 500 causes a graphic image representing the fairy carrying data to be displayed on the AR screen (S82). By changing to a graphic image representing data being carried, the user easily recognizes that data forwarding is being carried out.

Subsequently, when the data movement process in the server 200 is completed, the data moving unit 246 of the server 200 transmits notification of the completion of data movement to the smartphone 500 (S83). The fairy ID is included in the notification of the completion of data movement.

When the notification of the completion of data movement is received in the communication unit 506 of the smartphone 500, the AR display processing unit 526 of the smartphone 500 causes a graphic image representing the original form of the fairy to be displayed on the AR screen (S84). That is, a graphic image of the fairy when doing nothing is displayed. By returning to a graphic image representing the original form, the user easily recognizes that the data forwarding is finished.

Figure 24:
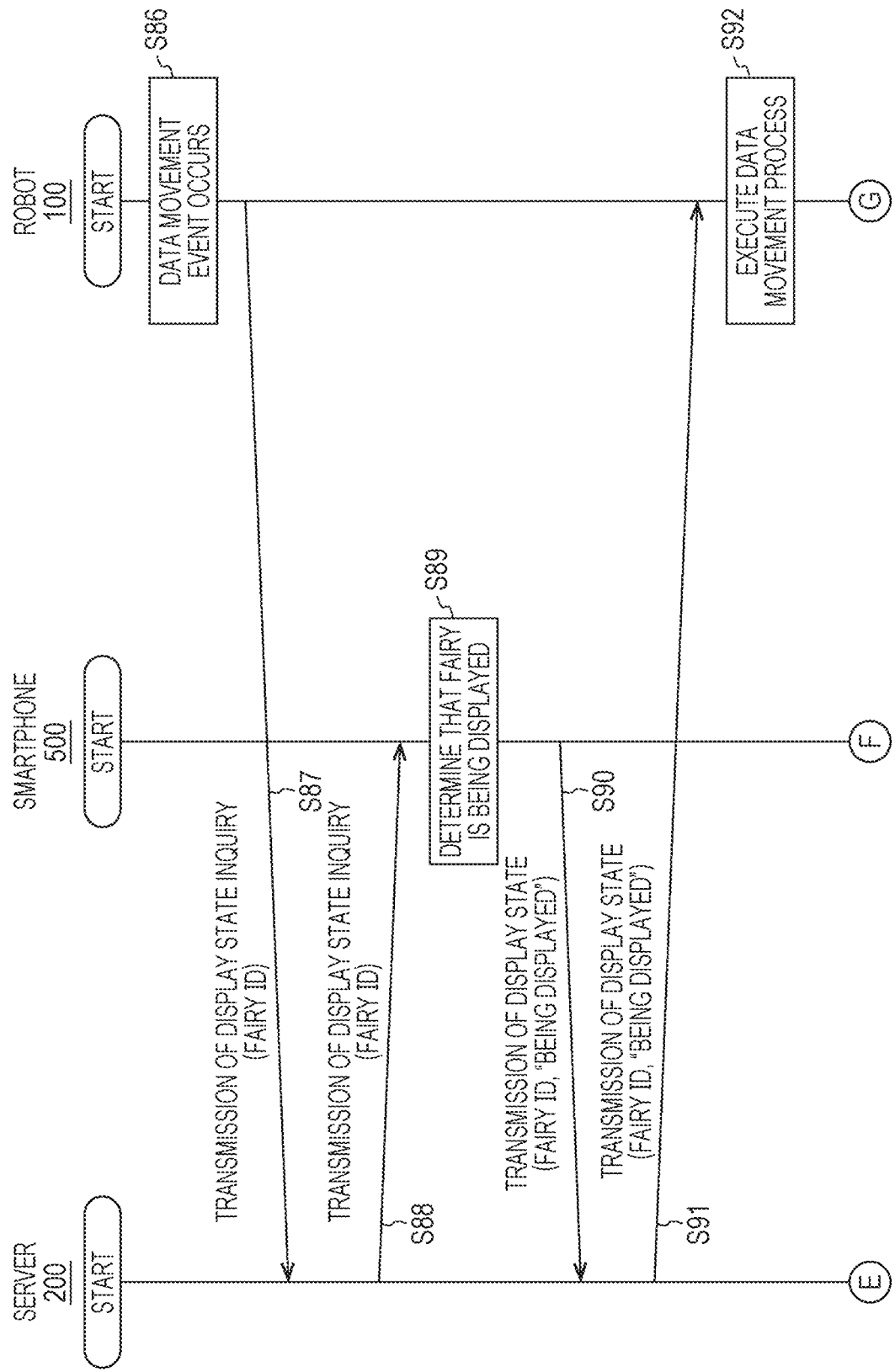
FIG. 24 is a sequence diagram relating to a data movement process in the robot.

Thirdly, an example wherein a data movement process is carried out in the robot 100 will be described. FIG. 24 is a sequence diagram relating to the data movement process in the robot 100.

The data moving unit 184 of the robot 100 determines whether or not a data movement event has occurred. For example, a data movement event occurs at a timing at which photographic data filmed by the camera of the robot 100 are automatically posted from the robot 100 to an SNS server. The photographic data may be data filmed in advance, or may be data filmed at a timing of the data movement.

When the data moving unit 184 determines that a data movement event has occurred (S86), the data moving unit 184 of the robot 100 transmits an inquiry relating to the display state of the fairy to the server 200 (S87). Fairy ID identifying the fairy for which the success or failure of the display is inquired about is included in the inquiry.

When the inquiry relating to the display state of the fairy is received in the communication unit 204 of the server 200, the virtual character processing unit 256 forwards the inquiry to the smartphone 500 (S88).

When the inquiry relating to the display state of the fairy is received in the communication unit 506 of the smartphone 500, the AR display processing unit 526 of the smartphone 500 determines whether or not the fairy according to the fairy ID is being displayed within the AR screen. When it is determined by the AR display processing unit 526 that the fairy is not being displayed, a display state indicating that the fairy is "not displayed" is transmitted from the communication unit 506 of the smartphone 500 to the server 200.

When the display state "not displayed" is received in the communication unit 204 of the server 200, the transmission of the inquiry relating to the display state of the fairy is repeated by the data moving unit 246 of the server 200. The smartphone 500 also repeats the heretofore described process. Consequently, a standby is continued unless the fairy is displayed.

Meanwhile, when it is determined by the AR display processing unit 526 of the smartphone 500 that the fairy is being displayed (S89), a display state indicating that the fairy is "being displayed" is transmitted to the server 200 (S90).

When the display state indicating that the fairy is "being displayed" is received in the communication unit 204 of the server 200, the virtual character processing unit 256 of the server 200 forwards the display state indicating that the fairy is "being displayed" to the robot 100 via the communication unit 204 (S91).

Figure 25:
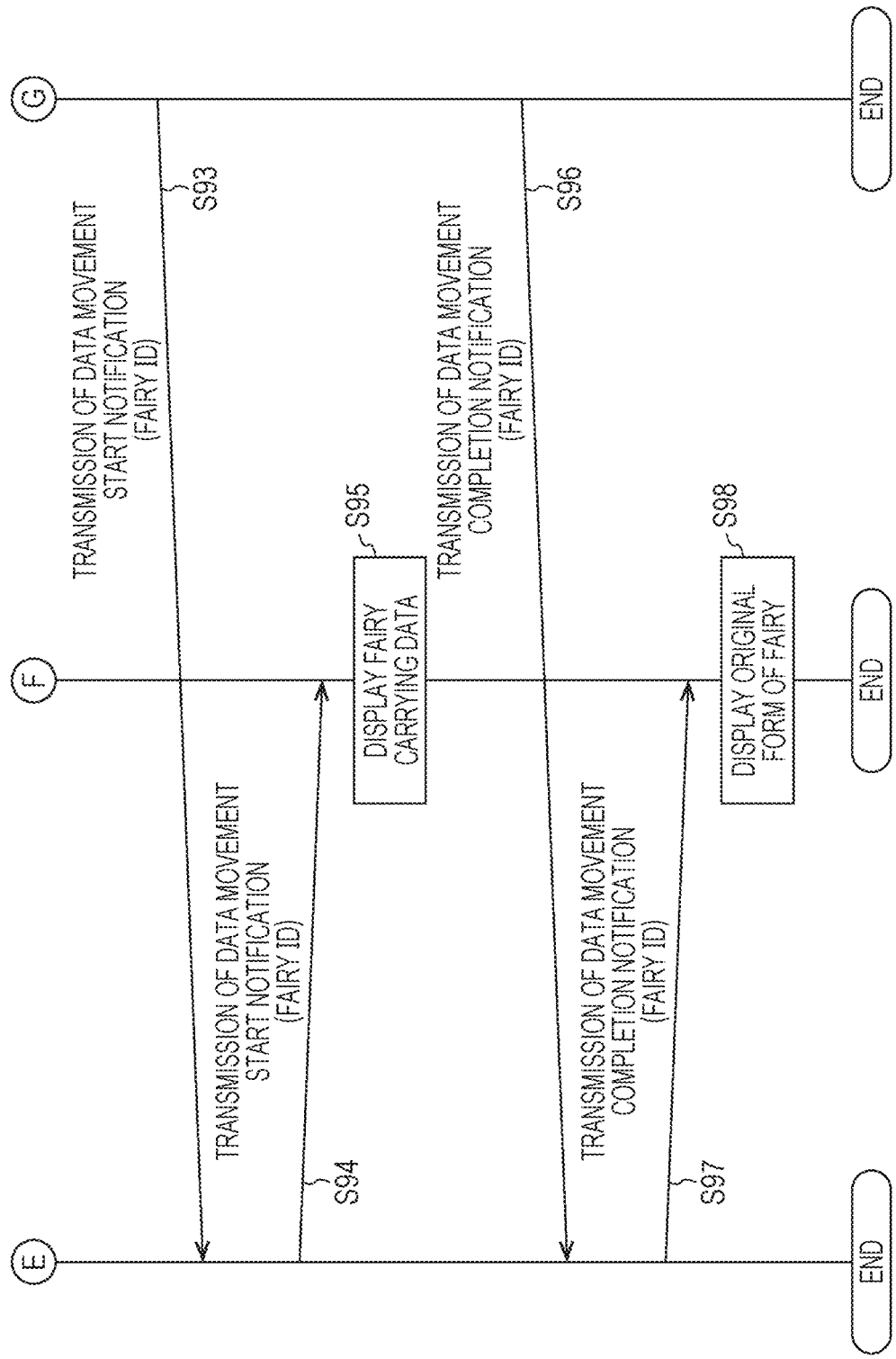
FIG. 25 is a sequence diagram showing a continuation of FIG. 24.

When the display state indicating that the fairy is "being displayed" is received in the communication unit 142 of the robot 100, the data moving unit 184 of the robot 100 executes a data movement process (S92). For example, photographic data are uploaded to an SMS server. A shift is made via terminals E, F, and G to a sequence shown in FIG. 25.

When the data movement process starts, the communication unit 142 of the robot 100 transmits notification of the start of data movement to the server 200 (S93). The fairy ID is included in the notification of the start of data movement.

When the notification of the start of data movement is received in the communication unit 204 of the server 200, the virtual character processing unit 256 of the server 200 forwards the notification of the start of data movement to the smartphone 500 via the communication unit 204 (S94).

When the notification of the start of data movement is received in the communication unit 506 of the smartphone 500, the AR display processing unit 526 of the smartphone 500 causes a graphic image representing the fairy carrying data to be displayed on the AR screen (S95). By changing to a graphic image representing data being carried, the user easily recognizes that data forwarding is being carried out.

Subsequently, when the data movement process in the robot 100 is completed, the communication unit 142 of the robot 100 transmits notification of the completion of data movement to the server 200 (S96). The fairy ID is included in the notification of the completion of data movement.

When the notification of the completion of data movement is received in the communication unit 204 of the server 200, the virtual character processing unit 256 of the server 200 forwards the notification of the completion of data movement to the smartphone 500 via the communication unit 204 (S97).

When the notification of the completion of data movement is received in the communication unit 506 of the smartphone 500, the AR display processing unit 526 of the smartphone 500 causes a graphic image representing the original form of the fairy to be displayed on the AR screen (S98). That is, a graphic image of the fairy when doing nothing is displayed. By returning to a graphic image representing the original form, the user easily recognizes that the data forwarding is finished.

By configuring so that data movement starts after a user visually recognizes the fairy in this way, a situation wherein data movement finishes without the user knowing can be avoided. Also, by the fairy being displayed in a form carrying data, the fact that data are moving is easily ascertained instinctively. There is also an aspect that the action of holding up the smartphone 500 in order to visually recognize the fairy is fun, and the user is caused to feel that "thanks to finding the fairy, I could get the fairy to do the work of carrying the data", because of which the user does not become bored.

Other Aspects

As another aspect, a configuration may be such that the fairy is automatically introduced when there is no user in the home. For example, the virtual character introducing unit 250 controls so that the fairy process is automatically started up when a deserted state continuing for a predetermined time or longer is recognized by the recognizing unit 212 of the server 200. Because of this, a configuration can be such that the robot 100 does not run out of triggers that spark a motion.

A specification wherein the fairy notices music playing indoors and encourages the robot 100 to dance, whereby the robot 100 starts to dance in time with the music, is also conceivable as another aspect. Specifically, when music detecting software mounted in the smartphone 500 detects music using sound data input via a microphone, a music detection result is transferred to the virtual character processing unit 256. The virtual character processing unit 256 forwards a music notification to the robot 100. On receiving the music notification, the robot 100 generates a music notification event, selects a dancing motion in accordance with the generation of the music notification event, and executes the motion.

When a user issues an instruction for a recovery of the fairy by operating the smartphone 500, the server 200 causes the processing by the virtual character processing unit 256 corresponding to the fairy to stop, and causes the virtual character processing unit 256 to be eliminated. Also, a configuration may be such that when a predetermined time elapses from the virtual character processing unit 256 being established, the virtual character processing unit 256 finishes processing, and eliminates itself.

The invention not being limited to the heretofore described embodiment and modified examples, components can be modified and embodied without departing from the scope of the invention. Various inventions may be formed by combining a multiple of the components disclosed in the heretofore described embodiment and modified examples as appropriate. Also, some of all the components shown in the heretofore described embodiment and modified examples may be eliminated.

Although a description has been given assuming that the robot system 300 is configured of one robot 100, one server 200, and the multiple of external sensors 114, one portion of the functions of the robot 100 may be realized by the server 200, and one portion or all of the functions of the server 200 may be allocated to the robot 100. One server 200 may control a multiple of the robot 100, or a multiple of the server 200 may control one or more of the robot 100 in cooperation.

A third device other than the robot 100 and the server 200 may manage one portion of functions. A collection of the functions of the robot 100 and the functions of the server 200 described in FIG. 9 can also be comprehensively grasped as one "robot". It is sufficient that a method of distributing the multiple of functions needed in order to realize the invention with respect to one or multiple items of hardware is determined with consideration to the processing capability of each item of hardware, specifications required of the robot system 300, and the like.

As heretofore described, "the robot in a narrow sense" is the robot 100 excluding the server 200, but "the robot in a wide sense" is the robot system 300. It is thought that there is a possibility of many functions of the server 200 being integrated in the robot 100 in future.

An action control program of the robot 100 may be provided via the Internet from a predetermined server, or may be provided using a fixed recording medium such as a CD-ROM.

In either case, the action control program of the robot 100 may be installed in the robot 100 by being provided from a recording medium (a server, a CD-ROM, or the like) differing from the robot 100.

Not being limited to a character with high familiarity such as a fairy, the virtual character may be a subject of dislike to the robot 100, such as a dinosaur or a monster. Familiarity with respect to a subject of dislike to the robot 100 (called a "disliked character") is set to be lower than that of a fairy or the like. Because of this, when a disliked character is introduced into the virtual space, the robot 100 behaves so as to escape from the disliked character.

Also, rather than a character that can move, such as a fairy, the virtual character may be an item representing an object that cannot move, such as a food item or an item of clothing. An affected internal parameter may be defined for each item. For example, a favorite item of food, clothing, or the like affects the curiosity parameter, increasing curiosity. As a result of this, when a favorite item is introduced into the virtual space, the robot 100 approaches the item. Also, a disliked item such as lightning affects an anxiety parameter, causing a feeling of anxiety to increase. As a result of this, when a disliked item is introduced into the virtual space, the robot 100 moves away from the item.

A favorite item and a disliked item may be introduced simultaneously, in which case the robot 100 adopts behavior of watching closely from a faraway place. By various items being added as virtual characters in this way, various kinds of control can be carried out.

It has been described that a function is temporarily added by the virtual character, but there may be various functions that are added. For example, when a fairy that finds a flower is introduced as the virtual character, object recognition ability of the robot 100 with respect to flowers increases, and the robot 100 finds a flower more easily than when the fairy is not introduced.

Also, a fire fairy and a water fairy are introduced, the fire fairy is correlated to a certain robot 100, and the water fairy is correlated to another robot 100. The robot 100 to which the fire fairy is correlated becomes able to carry out an attack, using fire, and the robot 100 to which the water fairy is correlated becomes able to carry out an attack using water. Further, an embodiment with a strong gaming element, wherein the robot 100 to which the fire fairy is correlated and the robot 100 to which the water fairy is correlated can fight using the respective attacking methods, can also be realized.

The robot 100 in the embodiment obeys an action order acquired via the fairy, because of which moderate heteronomy can be introduced while respecting a concept of a robot, that acts autonomously. Also, by supposing that the robot 100 includes a special cognitive ability of communicating with the fairy, there is also an aspect of being able to provide a user with a whimsical enjoyment.

Also, as the robot 100 autonomously executes a motion based on the position of the fairy, the robot 100 can exhibit independent behavior based on a positional relationship with the fairy.

Also, as the robot 100 moves toward the position of the fairy, the robot 100 can express an aspect of being enamored with the fairy. There is also an aspect of being able to indirectly cause a user to be aware of the position of the fairy.

Also, as the robot 100 autonomously executes a motion based on an operation of the fairy, the robot 100 can exhibit independent behavior in accordance with a movement of the fairy.

Also, as the robot 100 imitates an operation of the fairy, the robot 100 can express sympathy felt toward the fairy. There is also an aspect of being able to indirectly cause a user to be aware of an operation of the fairy.

Also, as an event of the actuality input system and an event of the virtual reality input system are handled in the same system, differences in handling events due to a difference in input systems are eliminated, and a world view wherein the actual space and the virtual space are fused can be smoothly realized.

Also, as a motion is determined in accordance with familiarity with respect to the fairy, moderate heteronomy can be realized.

Also, as familiarity with respect to the fairy is adjusted in accordance with a situation after obeying the fairy, the robot 100 easily builds trust with respect to the fairy.

Also, as a motion is determined in accordance with an emotion of the robot 100, moderate heteronomy can be realized.

Also, as an emotion of the robot 100 is adjusted in accordance with a situation after obeying the fairy, a flexible compliancy with respect to the fairy is easily built.

Also, virtual character information such as an image of the virtual character (for example, a fairy) may be changed using an API or the like.

What is claimed is:

1. A robot, comprising:
   a sensor configured to receive environment information relating to an actual space;
   a receiver configured to receive an action order from a virtual character in a virtual space;
   a non-transitory computer readable medium configured to store instructions thereon; and a processor connected to the non-transitory computer readable medium, wherein the processor is configured to execute the instructions for:
  determining a first motion based on the environment information;
  determining a second motion based on the action order in accordance with a familiarity with respect to the virtual character;
  selecting a motion from a plurality of motions comprising the first motion and the second motion; and
a drive mechanism configured to execute the selected motion.

2. The robot according to claim 1, wherein the processor is configured to execute the instructions for:
  determining a third motion based on a position of the virtual character in the virtual space, wherein the plurality of motions comprises the third motion.

3. The robot according to claim 2, wherein the third motion is a movement toward a position in the actual space corresponding to the position of the virtual character in the virtual space.

4. The robot according to claim 1, wherein the processor is configured to execute the instructions for:
  determining a third motion based on an operation of the virtual character, wherein the plurality of motions comprises the third motion.

5. The robot according to claim 4, wherein the third motion is an action imitating the operation of the virtual character.

6. The robot according to claim 1, wherein the processor is configured to execute the instructions for:
  generating a first event based on the environment information,
  generating a second event relating to the action order, and
  selecting the motion from the plurality of motions based on the first event and the second event.

7. The robot according to claim 1, wherein the processor is configured to execute the instructions for adjusting the familiarity with respect to the virtual character in response to execution of the second motion.

8. The robot according to claim 1, wherein the processor is configured to execute the instructions for determining the second motion based on a determined emotion of the robot.

9. The robot according to claim 8, wherein the processor is configured to execute the instructions for adjusting the emotion of the robot in response to execution of the second motion.

10. The robot according to claim 1, wherein the processor is configured to select the motion of the first motion in response to the first motion satisfying a predetermined condition.

11. The robot according to claim 1, wherein the processor is configured to select the motion of the second motion in response to the first motion failing to satisfy a predetermined condition.

12. The robot according to claim 1, wherein the processor is configured to select both the first motion and the second motion.

13. The robot according to claim 12, wherein the drive mechanism is configured to execute the first motion and the second motion in sequence in response to the selecting both the first motion and the second motion.

14. The robot according to claim 1, wherein the drive mechanism is configured to adjust a speed at which the selected motion is executed based on a familiarity with respect to the virtual character.

15. A robot control system comprising:
a user terminal, wherein the user terminal comprises:
  a transmitter configured to transmit an action order from a virtual character;
a server, wherein the server comprises:
  a receiver configured to receive information from the user terminal;
  a server processor configured to control the virtual character in a virtual space;
  a forwarding transmitter configured to forward the action order; and
a robot, wherein the robot comprises:
  a sensor configured to receive environment information relating to an actual space,
  a receiver configured to receive the action order from the forwarding transmitter,
  a non-transitory computer readable medium configured to store instructions, and
  a processor connected to the non-transitory computer readable medium, wherein the processor is configured to execute the instructions for:
    determining a first motion of the robot based on the environment information;
    heteronomously determining a second motion of the robot based on the action order and in accordance with a familiarity with respect to the virtual character;
    selecting a motion from a plurality of motions comprising the first motion and the second motion; and
  a drive mechanism configured to execute the selected motion.

16. The robot control system according to claim 15, wherein the user terminal further comprises:
  a camera configured to capture an image, and
  a display configured to display an augmented reality screen on which the virtual character is superimposed on the image based on a position of the virtual character in the virtual space, wherein
  the transmitter is configured to begin transmitting the action in response to displaying of the augmented reality screen of the user terminal.

17. The robot control system according to claim 15, wherein the processor is configured to execute the instructions for selecting the motion based on a distance between a position of the robot in the actual space and a position in the actual space based on a position of the virtual character in the virtual world being less than or equal to a threshold distance.

18. A robot, comprising:
a sensor configured to receive environment information relating to an actual space;
a receiver configured to receive an action order from a virtual character in a virtual space;
a non-transitory computer readable medium configured to store instructions thereon; and
a processor connected to the non-transitory computer readable medium, wherein the processor is configured to execute the instructions for:
  determining a first motion based on the environment information;
  determining a second motion based on the action order;
  selecting a motion from a plurality of motions comprising the first motion and the second motion; and
a drive mechanism configured to execute the selected motion, wherein the drive mechanism is configured to adjust a speed at which the selected motion is executed based on a familiarity with respect to the virtual character.

19. The robot according to claim 18, wherein the processor is further configured to execute the instructions for selecting the motion based on whether the familiarity exceeds a first threshold and whether a determined emotion satisfies a predetermined condition.

20. The robot according to claim 18, wherein the processor is further configured to execute the instructions for ignoring the virtual character in response to the familiarity being less than a first threshold or a determined emotion failing to satisfy a predetermined condition.

* * * * *